US012650714B2

(12) United States Patent
Wu et al.

(10) Patent No.: US 12,650,714 B2
(45) Date of Patent: Jun. 9, 2026

(54) ROTATING SHAFT MECHANISM AND ELECTRONIC DEVICE

(71) Applicant: HUAWEI TECHNOLOGIES CO., LTD., Shenzhen (CN)

(72) Inventors: Weifeng Wu, Dongguan (CN); Qiang Zhan, Shanghai (CN); Tao Huang, Shenzhen (CN); Weidong Yu, Shanghai (CN); Yangming Lin, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 18/574,291

(22) PCT Filed: Jun. 28, 2022

(86) PCT No.: PCT/CN2022/101928
§ 371 (c)(1),
(2) Date: Dec. 26, 2023

(87) PCT Pub. No.: WO2023/274233
PCT Pub. Date: Jan. 5, 2023

(65) Prior Publication Data
US 2024/0302864 A1 Sep. 12, 2024

(30) Foreign Application Priority Data
Jun. 30, 2021 (CN) .......................... 202110739235.2

(51) Int. Cl.
*G06F 1/16* (2006.01)
*H04M 1/02* (2006.01)

(52) U.S. Cl.
CPC .......... *G06F 1/1681* (2013.01); *G06F 1/1641* (2013.01); *G06F 1/1652* (2013.01); *H04M 1/022* (2013.01); *H04M 1/0268* (2013.01)

(58) Field of Classification Search
CPC .... G06F 1/1616; G06F 1/1641; G06F 1/1652; G06F 1/1681; H04M 1/022; H04M 1/0268
See application file for complete search history.

(56) References Cited

U.S. PATENT DOCUMENTS 9,348,450 B1* 5/2016 Kim ..................... H04M 1/0268
9,848,502 B1* 12/2017 Chu ..................... G06F 1/1681
11,032,402 B2* 6/2021 Liu ..................... H04M 1/0268
(Continued)

FOREIGN PATENT DOCUMENTS

CN 110312007 A 10/2019
CN 110319110 A 10/2019
(Continued)

*Primary Examiner* — Nidhi Thaker

(57) ABSTRACT

Embodiments provide a rotating shaft mechanism applicable to the field of foldable displays of electronic device technologies. The rotating shaft mechanism includes a main body, a first support plate, a second support plate, a middle support plate, a first swing arm, and a second swing arm. The first swing arm, the main body, and the first support plate may form a slider-crank, and the second swing arm, the main body, and the second support plate also form a slider-crank. The middle support plate may move relative to the main body when driven by at least one of the first support plate, the second support plate, the first swing arm, or the second swing arm.

20 Claims, 24 Drawing Sheets

(56)     References Cited

U.S. PATENT DOCUMENTS

2020/0355216  A1*   11/2020   Bae ........................ G06F 1/1652
2021/0044682  A1     2/2021   Liu et al.
2021/0165466  A1*   6/2021   Kang .................... G06F 1/1616
2021/0181808  A1*   6/2021   Liao .................... H04M 1/0216

FOREIGN PATENT DOCUMENTS

CN          110397668  A      11/2019
CN          111147637  A       5/2020
CN          112751961  A       5/2021
WO        2021115462  A1       6/2021

* cited by examiner

1000

151

1511

151c

ROTATING SHAFT MECHANISM AND ELECTRONIC DEVICE

CROSS-REFERENCE TO RELATED APPLICATION

This application is a national stage of International Application No. PCT/CN2022/101928 filed Jun. 28, 2022, which claims priority to Chinese Patent Application No. 202110739235.2 filed Jun. 30, 2021. Both of the aforementioned applications are hereby incorporated by reference in their entireties.

TECHNICAL FIELD

This application relates to the field of electronic device technologies, and in particular to a rotating shaft mechanism and an electronic device having the rotating shaft mechanism.

BACKGROUND

Currently, foldable screens are widely applied to mobile terminals, for example, foldable phones, foldable tablets, or the like. In such mobile terminals, a foldable screen is mainly implemented by combining a flexible display and a rotating shaft mechanism. In a use process of the mobile terminals, because the flexible display is repeatedly folded, the flexible display may be damaged.

To prolong a service life of the flexible display and improve reliability of a foldable electronic device, a folded part of the flexible display needs to have specific curvature deformation. In addition, uniformity of curvature across the folded part of the flexible display is also important for prolonging the service life of the flexible display. A key to implementing the curvature deformation and the uniformity of curvature across the folded part of the flexible display lies in the rotating shaft mechanism of the electronic device. Therefore, how to design the rotating shaft mechanism to improve reliability of the flexible display is an urgent problem to be resolved currently.

SUMMARY

This application provides a rotating shaft mechanism and an electronic device having the rotating shaft mechanism. A main objective is to provide a rotating shaft mechanism whose length may change as the electronic device is folded and unfolded.

To achieve the foregoing objective, the following technical solutions are used in embodiments of this application.

According to a first aspect, this application provides a rotating shaft mechanism. The rotating shaft mechanism may be applied to a foldable electronic device having a flexible display, for example, may be applied to a device such as a mobile phone or a tablet computer having a foldable display.

The rotating shaft mechanism includes a main body, a first door plate, a second support plate, a middle support plate, a first swing arm, and a second swing arm. The first support plate, the second support plate, and the middle support plate are located on a same side of the main body, the first support plate and the second support plate are disposed opposite on two sides of the middle support plate, and the first swing arm and the second swing arm are disposed opposite on two sides of the main body. An end that is of the first swing arm and that is close to the main body is rotatably connected to the main body, an end of the first support plate is rotatably connected to an end that is of the first swing arm and that is away from the main body, and the other end of the first swing arm is slidably connected to the main body. An end that is of the second swing arm and that is close to the main body is rotatably connected to the main body, an end of the second support plate is rotatably connected to an end that is of the second swing arm and that is away from the main body, and the other end of the second support plate is slidably connected to the main body. In this way, the first swing arm, the main body, and the first support plate may form a slider-crank. Similarly, the second swing arm, the main body, and the second support plate also form a slider-crank. In addition, at least one of the first support plate, the second support plate, the first swing arm, or the second swing arm is disposed with a support portion. When the first swing arm and the second swing arm rotate toward each other, the first swing arm drives the end that is of the first support plate and that is close to the main body to move in a direction away from the main body, and the second swing arm drives the end that is of the second support plate and that is close to the main body to move in a direction away from the main body, to enable the support portion to be separated from the middle support plate, and the middle support plate to move in a direction close to the main body. When the first swing arm and the second swing arm rotate away from each other, the first swing arm drives the end that is of the first support plate and that is close to the main body to move in a direction close to the main body, and the second swing arm drives the end that is of the second support plate and that is close to the main body to move in a direction close to the main body, to enable the support portion to abut against the middle support plate, and to drive the middle support plate to move in a direction away from the main body.

According to the rotating shaft mechanism provided in this application, both the first support plate and the second support plate that are located on two sides of the middle support plate may rotate in opposite directions relative to the main body when driven by the corresponding first swing arm and second swing arm. In this way, when the flexible display is disposed on a side that is of the first support plate, the middle support plate, and the second support plate and that is away from the main body, and when the first support plate and the second support plate rotate toward each other relative to the main body, the electronic device may be folded. On the contrary, when the first support plate and the second support plate rotate away from each other relative to the main body, the electronic device may be unfolded.

In addition, in a structure of the rotating shaft mechanism provided in this application, the middle support plate located between the first support plate and the second support plate is not fastened, but may move relative to the main body. When the first support plate and the second support plate rotate toward each other, that is, when the electronic device is switched from an unfolded state to a folded state, the middle support plate moves close to the main body. In this way, a length size of the rotating shaft mechanism may be increased, and the first support plate, the middle support plate, and the second support plate enclose an accommodating cavity with a structure that is close to a triangular structure. A part of the flexible display that is being folded and that is close to the rotating shaft mechanism is located in the formed accommodating cavity and may not be squeezed. This may avoid a phenomenon that the flexible display is damaged due to a plurality of times of being folded and squeezed.

When the first swing arm and the second swing arm rotate away from each other, that is, the electronic device rotates from the folded state to the unfolded state, the middle support plate moves away from the main body. In this way, a length of the rotating shaft mechanism that is previously increased is reduced. The middle support plate moves until the first support plate, the middle support plate, and the second support plate are coplanar, which is used to support the unfolded flexible display.

The drive structure that drives the middle support plate to move provided in this application is implemented by using the support portion of at least one of the first support plate, the second support plate, the first swing arm, or the second swing arm. In other words, when the first support plate, the second support plate, the first swing arm, and the second swing arm rotate, the support portion abuts against and is separated from the middle support plate, to drive the middle support plate to be close to or away from the main body. In comparison with an additionally disposed drive structure, mechanical linkage is used in this application. In this way, a structure of the entire rotating shaft mechanism may be simplified, and is easy to implement.

In a possible implementation of the first aspect, when the first swing arm and second swing arm rotate toward each other to drive the first support plate and the second support plate to rotate toward each other to a first position, the first support plate, the middle support plate, and the second support plate enclose screen accommodation space. The first position herein may be understood as a position of the first support plate and the second support plate when the electronic device is in the folded state. In this case, the first support plate and the second support plate may form a preset angle, and the middle support plate sinks to a preset position. A space similar to a triangle but open may be formed between the first support plate, the second support plate, and the middle support plate, and a bent part of the flexible display is accommodated in the space.

It may be described as following. When the first swing arm and the second swing arm rotate toward each other until the electronic device is in the folded state, a length size of the rotating shaft mechanism increases, to increase a curvature radius of the flexible display, and prevent the flexible display from being squeezed.

In a possible implementation of the first aspect, when the first swing arm and second swing arm rotate away from each other to drive the first support plate and the second support plate to rotate away from each other to a second position, the first support plate, the middle support plate, and the second support plate are coplanar to form a support surface.

In other words, when being driven by the first swing arm and the second swing arm, the first support plate, the middle support plate, and the second support plate may be coplanar, to support the unfolded flexible display, and a user may perform an operation on the unfolded flexible display.

In a possible implementation of the first aspect, supporting portions are disposed on both the first support plate and the second support plate.

In a possible implementation of the first aspect, support portions are disposed on both the first swing arm and the second swing arm.

In a possible implementation of the first aspect, support portions are disposed on each of the first support plate, the second support plate, the first swing arm, and the second swing arm.

Because the first support plate and the second support plate are symmetrically disposed on two sides of the middle support plate, and the first swing arm and the second swing arm are symmetrically disposed on two sides of the main body, balance of support for the middle support plate may be improved, so that the middle support plate may move stably.

In a possible implementation of the first aspect, a process in which the first swing arm and the second swing arm move toward each other includes a first phase, a second phase, and a third phase that sequentially appear. In the first phase, both the support portion of the first support plate and the support portion of the second support plate abut against the middle support plate, and both the support portion of the first swing arm and the support portion of the second swing arm abut against the middle support plate. In the second phase, both the support portion of the first swing arm and the support portion of the second swing arm abut against the middle support plate. In the third phase, the support portion of the first support plate, the support portion of the second support plate, the support portion of the first swing arm, and the support portion of the second swing arm are all separated from the middle support plate.

Because of a relative connection relationship between the first support plate, the first swing arm, the main body, the second support plate, and the second swing arm, if the support portion of any one of the first support plate, the second support plate, the first swing arm, and the second swing arm may exert an acting force on the middle support plate, a moving speed of the middle support plate may be controlled. For example, when the electronic device moves from the unfolded state to the folded state, at an initial phase, the middle support plate may move quickly under control of the support portion of the first support plate and the support portion of the second support plate, to yield sufficient accommodation space, to avoid an arching phenomenon of the flexible display. As the flexible display continues to be folded, the middle support plate reduces a moving speed under control of the support portion of the first swing arm and the support portion of the second swing arm. A phenomenon that stress concentration or even damage due to being pulled occurs on a bent part of the flexible display resulting from excessively fast withdrawal of force of the middle support plate is avoided.

In a possible implementation of the first aspect, the rotating shaft mechanism further includes a retractable traction element, where an end of the traction element is fastened to the main body, the other end of the traction element is fastened to the middle support plate, and the traction element is configured to drive the middle support plate to move in a direction close to the main body.

In a process in which the first support plate and the second support plate move toward the main body to fold the electronic device, because the middle support plate is close to the main body and is pulled by the retractable traction element, a triangular accommodation space structure formed by the first support plate, the second support plate, and the middle support plate may be maintained, to prevent the middle support plate from being away from the main body and prevent the flexible display from being squeezed.

In a possible implementation of the first aspect, the retractable traction element includes a spring. Certainly, the retractable traction element may be another elastic structure.

In a possible implementation of the first aspect, the rotating shaft mechanism further includes a guide structure, where the guide structure is configured to guide the middle support plate to move relative to the main body along a direction perpendicular to a length direction of the middle support plate.

When any one of structures of the first support plate, the second support plate, the first swing arm, and the second swing arm exerts an acting force on the middle support plate, it may not be ensured that the acting force is perpendicular to the length direction of the middle support plate at any time, and consequently, a phenomenon of moving deviation of the middle support plate is caused. Therefore, the guide structure is introduced to guide up and down straight-line movement of the middle support plate.

In a possible implementation of the first aspect, the guide structure includes a guide hole disposed in the main body and a guide block disposed in the guide hole in a sliding manner. The guide hole extends along a direction perpendicular to the length direction of the middle support plate. The guide block is fastened to the middle support plate.

In the foregoing technical solution, the guide block is relatively fastened to the middle support plate, the guide hole is disposed on the main body, and the guide block slides in the guide hole to guide the middle support plate to move in a straight line. It may be understood that, in another implementation, the guide block is disposed on the main body, and the guide hole is disposed on the middle support plate. In a word, linear movement of the middle support plate is guided by sliding coordination of the guide block and the guide hole.

In a possible implementation of the first aspect, an opening that is of the guide hole and that is close to the middle support plate has a blocking portion, the traction element is disposed in the guide hole, the guide block has a blind hole disposed from a surface close to the middle support plate toward a bottom surface of the guide hole, an end of the traction element is fastened to the blocking portion, and the other end of the traction element abuts against the bottom surface of the blind hole.

In this way, the guide hole not only has a function of accommodating the guide block, but also has a function of hiding the traction element in the guide hole.

In a possible implementation of the first aspect, each of the first support plate, the second support plate, and the middle support plate has two opposite surfaces, one of the surfaces is used as a support surface to support the flexible display, and the other surface is away from the support surface. The surface that is of the middle support plate and that is away from the support surface faces the main body. Both surfaces that are of the first support plate and the second support plate and that are away from the support surface has an extension portion, the extension portion extends toward the surface that is of the middle support plate and that faces the main body, and the extension portion has a first boss protruding toward the middle support plate, to form the support portion of the first support plate and the support portion of the second support plate.

The first bosses are disposed on both the extension portion of the first support plate and the extension portion of the second support plate, so that the extension portion of the first support plate and the extension portion of the second support plate abut against the middle support plate, to drive the middle support plate to move relative to the main body.

In a possible implementation of the first aspect, a support plate sliding slot is disposed on both the extension portion of the first support plate and the extension portion of the second support plate, a sliding shaft is disposed in the support plate sliding slot, the sliding shaft is fastened to the main body, and the sliding shaft slides relative to the support plate sliding slot, to implement a slidable connection between the first support plate and the second support plate and the main body.

The first bosses that are used to abut against the middle support plate is disposed on the extension portions of the first support plate and the second support plate, to drive the middle support plate to move. In addition, a chute may be further disposed on the extension portions of the first support plate and the second support plate, to implement a slidable connection between the first support plate and the main body. In comparison with separately disposing a structure used to provide the support plate sliding slot, the structure provided in this application is more simplified.

In a possible implementation of the first aspect, ends that are of the first swing arm and the second swing arm and that are close to the main body have a second boss protruding toward a surface that is of the middle support plate and that faces the main body, to form the support portion of the first swing arm and the support portion of the second swing arm.

To be specific, the second bosses are disposed on both the first swing arm and the second swing arm, to abut against the middle support plate, and drive the middle support plate to move relative to the main body.

In a possible implementation of the first aspect, a first arc-shaped bump and a second arc-shaped bump are disposed on the main body. A first arc-shaped arm with an arc-shaped structure is formed at an end that is of the first swing arm and that is close to the main body, a first arc-shaped slot configured to assemble the first arc-shaped bump is disposed on the first arc-shaped arm, and the first arc-shaped bump slides relative to the first arc-shaped slot, to implement a rotating connection between the first swing arm and the main body. A second arc-shaped arm with an arc-shaped structure is formed at an end that is of the second swing arm and that is close to the main body, a second arc-shaped slot configured to assemble the second arc-shaped bump is disposed on the second arc-shaped arm, and the second arc-shaped bump slides relative to the second arc-shaped slot, to implement a rotating connection between the second swing arm and the main body. The second boss is disposed on the first arc-shaped arm and the second arc-shaped arm.

To be specific, the arc-shaped slot is disposed on the arc-shaped arm close to the main body, and the arc-shaped bump is disposed on the main body. The first swing arm and the second swing arm rotate relative to the main body by using relative sliding of the arc-shaped slot and the arc-shaped slot. In addition, the second boss that is used to abut against the middle support plate is also disposed on the arc-shaped arm, so that a structure of the rotating shaft mechanism is compact, and is simplified.

In a possible implementation of the first aspect, a surface that is of the first support plate and that is relative to the main body has a first support plate arc-shaped bump extending toward the first swing arm, a third arc-shaped slot configured to assemble the first support plate arc-shaped bump is disposed on the first swing arm, and the first support plate arc-shaped bump slides relative to the third arc-shaped slot, to implement a rotating connection between the first support plate and the first swing arm. A surface that is of the second support plate and that is relative to the main body has a second support plate arc-shaped bump extending toward the second swing arm, a fourth arc-shaped slot configured to assemble the second support plate arc-shaped bump is disposed on the second swing arm, and the second support plate arc-shaped bump slides relative to the fourth arc-shaped slot, to implement a rotating connection between the second support plate and the second swing arm.

Similar to the structure of the rotating connection between the first swing arm and the second swing arm relative to the main body, the rotating connection between the first support plate and the first swing arm and the rotating connection between the second support plate and the second swing arm are also implemented by rotation coordination between the arc-shaped bump and the arc-shaped slot. Such a rotating connection manner has a simple structure and is also convenient to implement.

In a possible implementation of the first aspect, the rotating shaft mechanism further includes a synchronization structure, where the synchronization structure is separately connected to the first swing arm and the second swing arm in a sliding manner, and the synchronization structure is configured to implement synchronous reverse rotation of the first swing arm and the second swing arm.

By disposing the synchronization structure, synchronous reverse rotation of the first support plate and the second support plate may be implemented, that is, synchronous rotation toward each other and synchronous reverse rotation of the first support plate and the second support plate may be implemented. When the rotating shaft mechanism of the structure is applied to the electronic device, user experience may be obviously improved.

In a possible implementation of the first aspect, the synchronization structure includes, for example, a first gear connecting rod, a first driven gear, a second driven gear, and a second gear connecting rod that externally mesh sequentially. Specifically, an end of the first gear connecting rod is slidably connected to an end that is of the first swing arm and that is away from the main body, and the other end of the first gear connecting rod forms a first meshing tooth. The first driven gear externally meshes the first meshing tooth. The second driven gear externally meshes the first driven gear. An end of the second gear connecting rod is slidably connected to an end that is of the second swing arm and that is away from the main body, the other end of the second gear connecting rod forms a second meshing tooth, and the second driven gear externally meshes the second meshing tooth.

Certainly, in some possible implementations, more even-numbered driven gears may be alternatively included.

In a possible implementation of the first aspect, the rotating shaft mechanism further includes an end cap. The end cap is disposed on a side that is of the main body and that is away from the first support plate, the middle support plate, and the second support plate, and the main body and the end cover are relatively fastened.

When the rotating shaft mechanism including the end cap is applied to the electronic device, the end cap is disposed, so that the end cap is exposed after the first housing and the second housing are folded, which avoids a gap formed in appearance, and improves appearance aesthetics of the entire electronic device.

According to a second aspect, this application further provides an electronic device, including a first housing, a second housing, a flexible display, and the rotating shaft mechanism in any implementation of the first aspect. The first housing is fastened to a first swing arm, and the second housing is fastened to a second swing arm. The first housing includes a first surface, the second housing includes a second surface, the flexible display continuously covers the first surface of the first housing, the rotating shaft mechanism, and the second surface of the second housing. The flexible display is separately fastened to the first surface of the first housing and the second surface of the second housing.

The electronic device provided in this application includes the rotating shaft mechanism according to the first aspect. Therefore, when the first housing and the second housing move toward each other, not only the first support plate and the second support plate in the rotating shaft mechanism generate rotating motion, the middle support plate located between the first support plate and the second support plate also may move toward the main body, to yield sufficient accommodation space for the flexible display that is being folded, and prevent the flexible display from being squeezed and deformed. On the contrary, when the first housing and the second housing move away from each other, and the flexible display is driven to be unfolded, the middle support plate moves away from the main body until the first support plate, the middle support plate, and the second support plate are coplanar, to support the unfolded flexible display.

In addition, a drive structure that drives the middle support plate to move uses a support portion on at least one of the rotating first swing arm, the first support plate, the second swing arm, or the second support plate. In this way, a structure of the rotating shaft mechanism may be simplified.

In a possible implementation of the second aspect, the flexible display includes a first region, a second region, a third region, a fourth region, and a fifth region that are consecutively disposed. The first area is fastened to the first surface of the first housing, the second area is fastened to a surface that is of the first support plate and that faces the flexible display, the third area is disposed opposite to the middle support plate, and the third area may move relative to the middle support plate, the fourth area is fastened to a surface that is of the second support plate and that faces the flexible display, and the fifth area is fastened to the second surface of the second housing.

In a possible implementation of the second aspect, the rotating shaft mechanism includes an end cap. When the electronic device is unfolded, the end cap is hidden in the first housing and the second housing; and when the electronic device is folded, the end cap is exposed outside the first housing and the second housing, to compensate for a gap between the first housing and the second housing.

In other words, regardless of whether the electronic device is in a folded state or in an unfolded state, for appearance of the electronic device, the first housing and the second housing are both seamlessly closed, which improves appearance aesthetics of the display device.

In a possible implementation of the second aspect, the electronic device includes a mobile terminal, for example, may be a foldable phone, a foldable tablet, or a foldable e-book.

REFERENCE NUMERALS

1000: rotating shaft mechanism; 2000: first housing; 2001: first surface; 2002: third surface; 3000: second housing; 3001: second surface; 3002: fourth surface; 4000: flexible display;

11: middle support plate; 12: first support plate; 13: second support plate; 14: main body; 151: first swing arm; 152: second swing arm; 16: sliding shaft; 171: first gear connecting rod; 1711: first meshing tooth; 172: second gear connecting rod; 1721: second meshing tooth; 173: first driven gear; 174: second driven gear; 175: first connecting shaft; 176: second connecting shaft; 177: third connecting shaft; 178: fourth connecting shaft; 19: pin shaft; 201: first synchronization structure; 202: second synchronization structure; 21: end cap; 22: guide block; 23: traction element; 24: guide hole; 25: connection element; 26: blind hole;

121: extension portion; 12a: first support plate arc: shaped bump; 12b: first support plate sliding slot; 12c: boss; 13b: second support plate sliding slot; 14a: first arc-shaped bump; 14b: second arc-shaped bump; 141: blocking portion; 1511: support; 1512: arc-shaped arm; 151a: first arc-shaped slot; 151b: mounting hole; 151c: third arc-shaped slot; 151d: first track slot; 151e: supporting portion; 151f: boss; 152a: second arc-shaped slot; and 152d: second track slot.

DESCRIPTION OF EMBODIMENTS

The following describes each of the following embodiments of this application with reference to the accompanying drawings in embodiments of this application.

An embodiment of this application provides a foldable electronic device. The foldable electronic device may include various electronic devices that have a flexible display and that may change an unfolded or folded form of the flexible display and the foldable electronic device. Under different use requirements, the foldable electronic device may be unfolded to an unfolded state, or may be folded to a folded state, or may be in an intermediate state between the unfolded state and the folded state. In other words, the foldable electronic device has at least two states: the unfolded state and the folded state. In some cases, the foldable electronic device may further have a third state, namely the intermediate state between the unfolded state and the folded state. It may be understood that the intermediate state is not a unique state, and may be any one or more states between the unfolded state and the folded state of the electronic device.

For example, the foldable electronic device may be but is not limited to a mobile phone, a tablet computer, a laptop computer, an e-book reader, a camera, a wearable device, a home electronic device, or the like. For ease of understanding, in embodiments of this application, that the foldable electronic device is a mobile phone is used as an example.

Figure 1A:
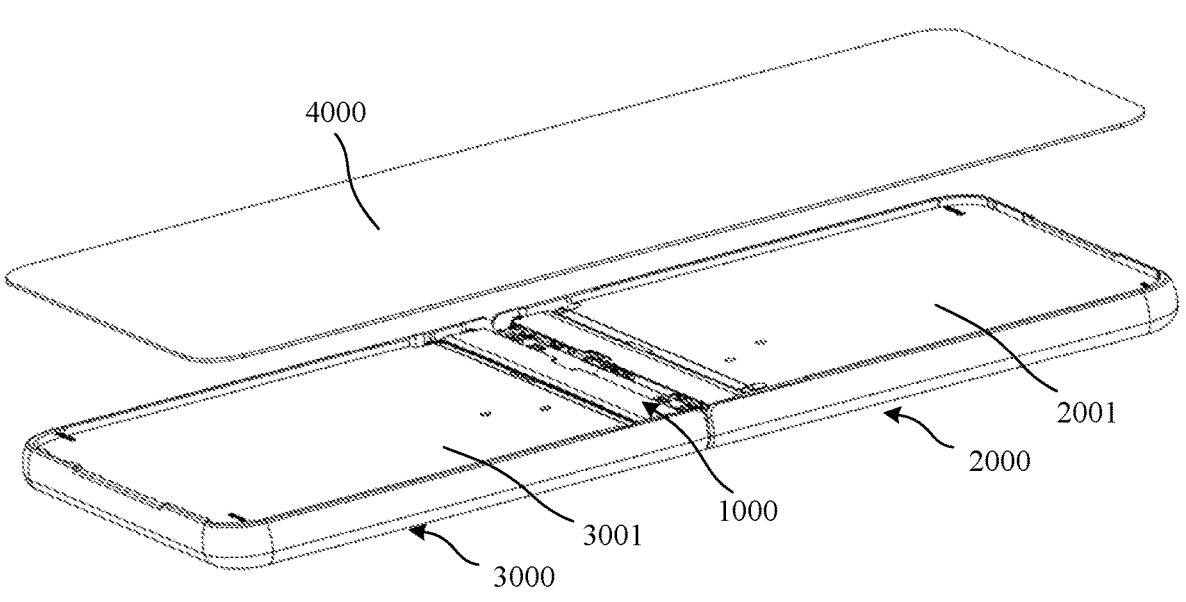
FIG. 1a is an exploded view of an electronic device in an unfolded state according to an embodiment of this application.
Figure 1B:
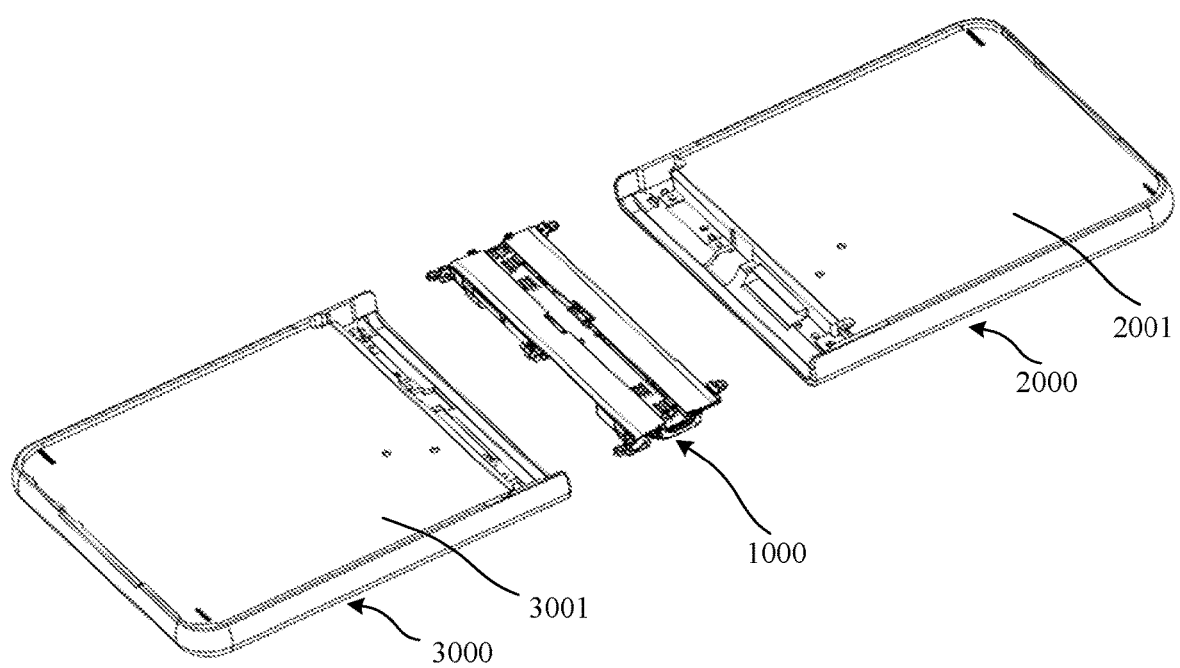
FIG. 1b is an exploded view of an electronic device in an unfolded state after a flexible display is removed according to an embodiment of this application.

Refer to FIG. 1a and FIG. 1b. FIG. 1a is an exploded view of a foldable electronic device according to an embodiment of this application, and FIG. 1b is an exploded view of an electronic device in an unfolded state after a flexible display is removed according to an embodiment of this application. With reference to FIG. 1a and FIG. 1b, the foldable electronic device may include a rotating shaft mechanism 1000, a first housing 2000, a second housing 3000, and a flexible display 4000.

The first housing 2000 and the second housing 3000 are disposed on two sides of the rotating shaft mechanism 1000 and are respectively connected to the rotating shaft mechanism 1000. The rotating shaft mechanism 1000 may move, so that the first housing 2000 and the second housing 3000 are folded or unfolded relative to each other.

The first housing 2000 and/or the second housing 3000 may respectively form a mounting space for mounting an electronic component such as a circuit board, a battery, a receiver, a speaker, or a camera of the electronic device. The circuit board may integrate electronic components such as a main controller, a storage unit, an antenna module, and a power management module of the electronic device. The battery may supply power to the electronic components such as the flexible display 4000, the circuit board, the receiver, the speaker, and the camera. The first housing 2000 and the second housing 3000 may be equal in thickness, or may be unequal in thickness. This is not limited in this embodiment of this application.

In a possible design, the mounting space may be disposed in both the first housing 2000 and the second housing 3000, to distribute the components of the electronic device in the housings on the two sides. In another possible design, the mounting space may be disposed in only the first housing 2000, to gather the components of the electronic device in the first housing 2000; or the mounting space may be disposed in both the first housing 2000 and the second housing 3000, but most of the components of the electronic device are disposed in the first housing 2000, and a small part is disposed in the second housing 3000, so that the second housing 3000 is lighter, to facilitate implementation of folding and unfolding.

Figures 1C, 2:
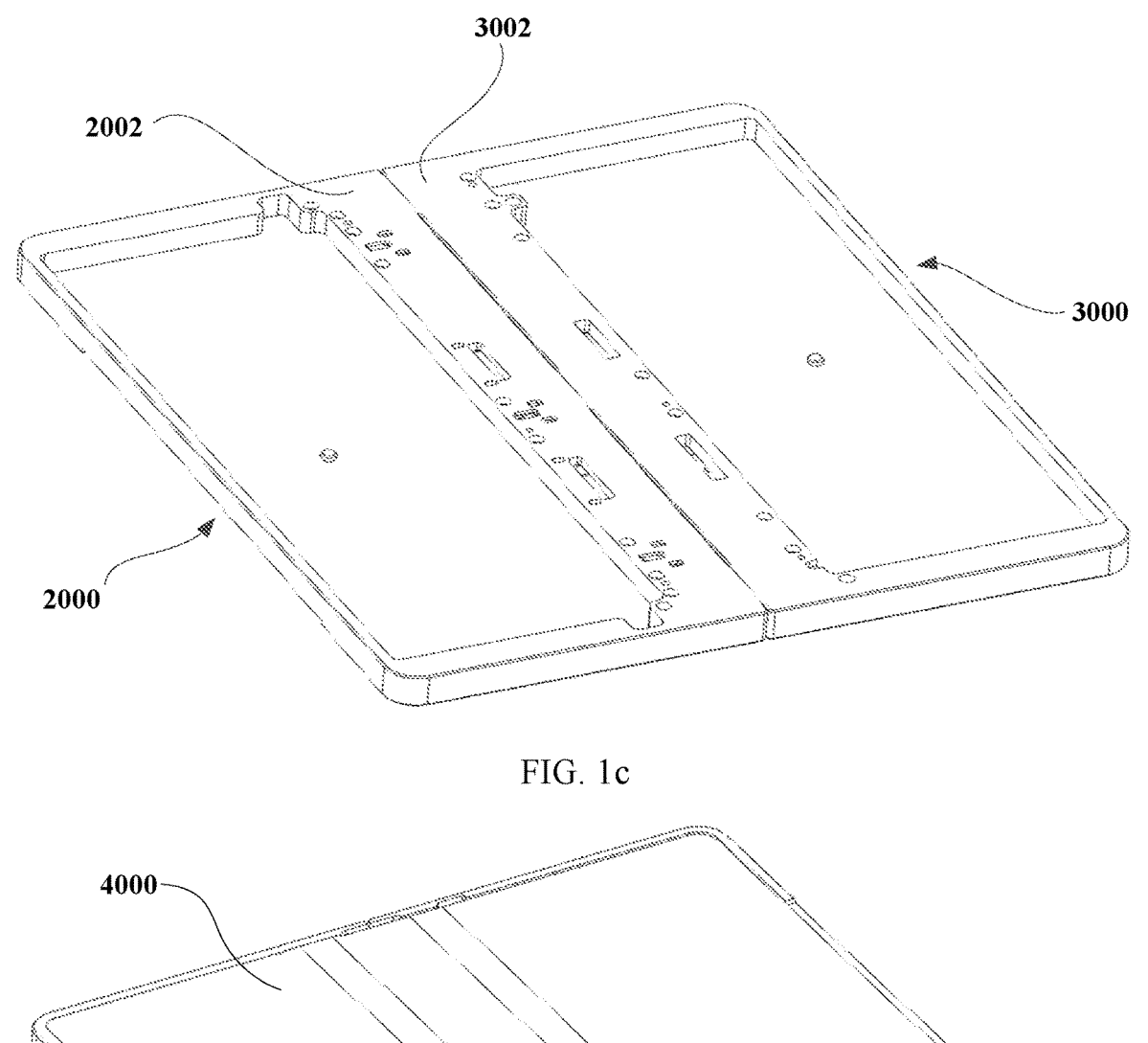
FIG. 1c is a schematic diagram of a structure of a rear side of an electronic device in an unfolded state according to an embodiment of this application.
FIG. 2 is a schematic diagram of a structure of an electronic device in an unfolded state according to an embodiment of this application.

Refer to FIG. 1b and FIG. 1c. FIG. 1c is a schematic diagram of a structure of a rear side of the foldable electronic device according to this embodiment of this application. In this embodiment of this application, the first housing 2000 has a first surface 2001 and a third surface 2002 that is disposed opposite to the first surface 2001. The second housing 3000 has a second surface 3001 and a fourth surface 3002 that is disposed opposite to the second surface 3001. The first surface 2001 of the first housing 2000 and the second surface 3001 of the second housing 3000 may jointly support the flexible display 4000. The third surface 2002 of the first housing 2000 and the fourth surface 3002 of the second housing 3000 may be used as an appearance surface of the electronic device. In addition, it may be understood that in some application scenarios, a display may alternatively be disposed on the third surface 2002 of the first housing 2000 and/or the fourth surface 3002 of the second housing 3000. The display may be a flexible display or a non-flexible display. This is not specifically limited herein.

Refer to FIG. 2. FIG. 2 is a schematic diagram of a structure of an electronic device in which the first housing 2000 and the second housing 3000 are unfolded opposite to each other to the unfolded state. In this embodiment of this application, when the first housing 2000 and the second housing 3000 are in the unfolded state, with reference to FIG. 1a and FIG. 2, the first surface 2001 of the first housing 2000 and the second surface 3001 of the second housing 3000 are in a same plane. In this case, an included angle between the first surface 2001 and the second surface 3001 may be approximately 180° (a tolerance of a specific angle is also allowed, and the included angle between the first surface 2001 and the second surface 3001 is, for example, 165°, 177°, or 185°).

Figure 3A:
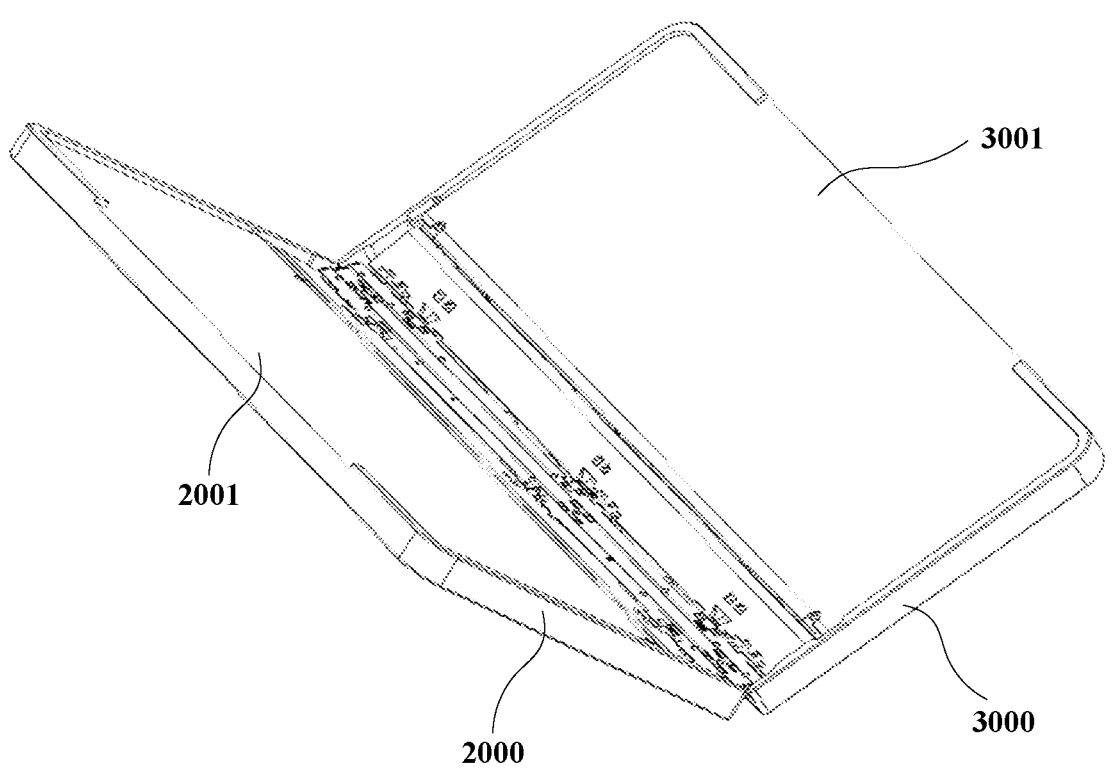
FIG. 3a is a schematic diagram of a structure of an electronic device in an intermediate state according to an embodiment of this application.
Figure 3B:
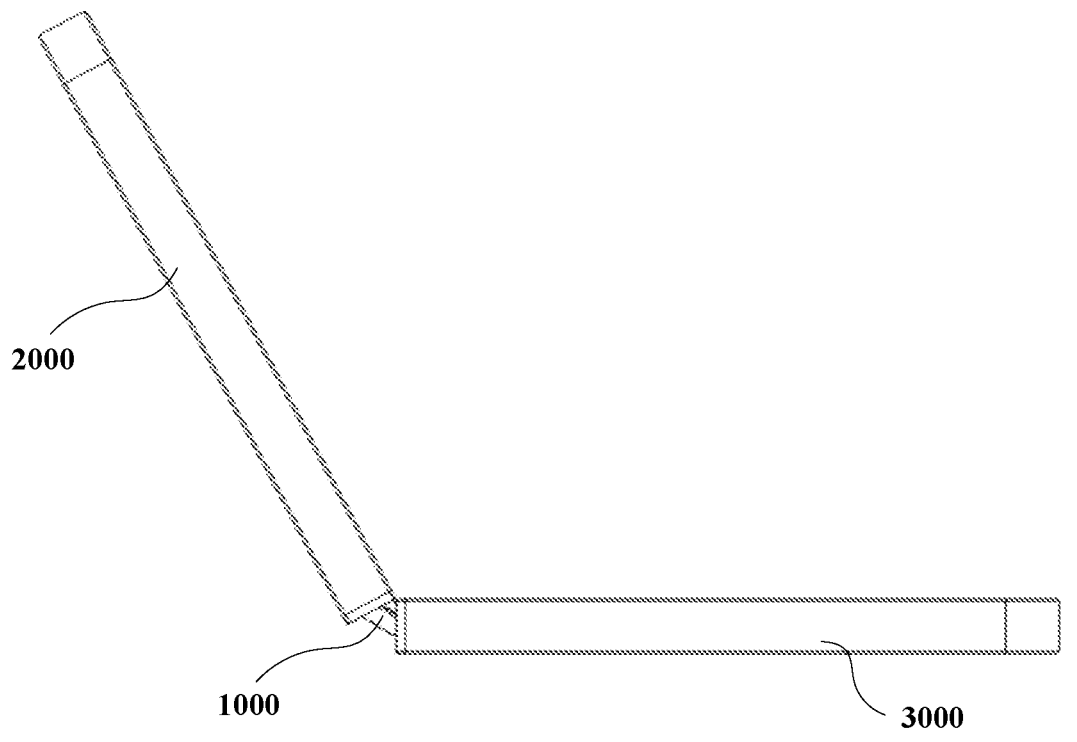
FIG. 3b is a side view of an electronic device in an intermediate state according to an embodiment of this application.

Refer to FIG. 3a and FIG. 3b. FIG. 3a shows a schematic diagram of a structure of the electronic device in which the first housing 2000 and the second housing 3000 rotate (being unfolded or folded) relative to each other to the intermediate state. FIG. 3b shows a side view of the structure of the electronic device in which the first housing 2000 and the second housing 3000 rotate (being unfolded or folded) relative to each other to the intermediate state. The flexible display 4000 is omitted in FIG. 3a, to display forms of the two housings in the intermediate state. In this case, the electronic device may be in any state between the unfolded state and the folded state. For example, the included angle between the first surface 2001 of the first housing 2000 and the second surface 3001 of the second housing 3000 may range, for example, from 130° to 150°.

Figure 4:
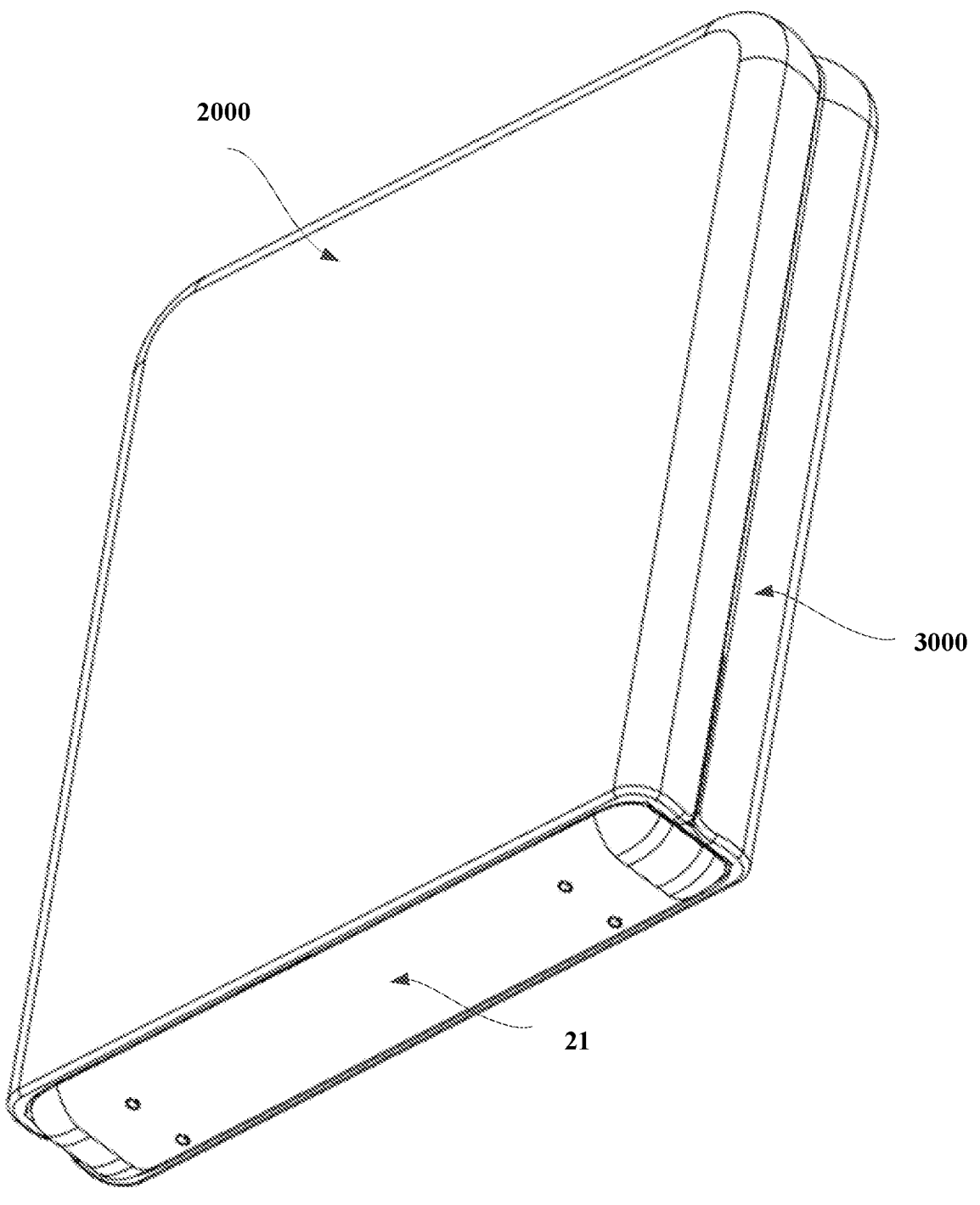
FIG. 4 is a schematic diagram of a structure of an electronic device in a folded state according to an embodiment of this application.

Still refer to FIG. 4. FIG. 4 is a schematic diagram of a structure of the electronic device in which the first housing 2000 and the second housing 3000 are folded toward each other to the folded state. As shown in FIG. 1a and FIG. 4, when the first housing 2000 and the second housing 3000 are in the folded state, the first surface 2001 of the first housing 2000 and the second surface 3001 of the second housing 3000 face toward or away from each other (specifically related to a folding type). In this case, the first surface 2001 of the first housing 2000 and the second surface 3001 of the second housing 3000 may form a small included angle or may be parallel to each other, so that the two housings may be completely folded (a tolerance of a specific angle is also allowed).

The flexible display 4000 may be configured to display information and provide an interaction interface for a user. In embodiments of this application, the flexible display 4000 may be but is not limited to an organic light-emitting diode (organic light-emitting diode, OLED) display, an active-matrix organic light-emitting diode (active-matrix organic light-emitting diode, AMOLED) display, a mini organic light-emitting diode (mini organic light-emitting diode) display, a micro light-emitting diode (micro light-emitting diode) display, a micro organic light-emitting diode (micro organic light-emitting diode) display, a quantum dot light-emitting diode (quantum dot light-emitting diode, QLED) display, or the like.

Further refer to FIG. 1*a* and FIG. 2, the flexible display 4000 continuously covers the first surface 2001 of the first housing 2000, the rotating shaft mechanism 1000, and the second surface 3001 of the second housing 3000 of the foldable electronic device. The flexible display 4000 may be divided into consecutive regions A, B, C, D, and E. The regions B, C, and D include bent portions when being folded. The region A corresponds to the first surface 2001 of the first housing 2000, and may be fastened to the first surface 2001 of the first housing 2000. The region E corresponds to the second surface 3001 of the second housing 3000, and may be fastened to the second surface 3001 of the second housing 3000. It should be noted that boundaries of the regions B, C, and D shown in the figure are merely examples, and the boundaries of the regions B, C, and D may be adjusted based on a specific design of the rotating shaft mechanism 1000.

Figure 5A:
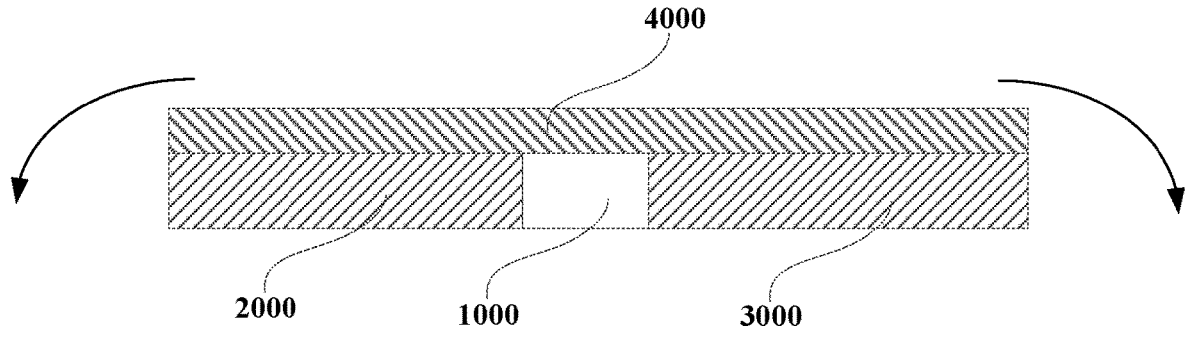
FIG. 5a is a schematic diagram of a structure of an outward-folding electronic device in an unfolded state.
Figure 5B:
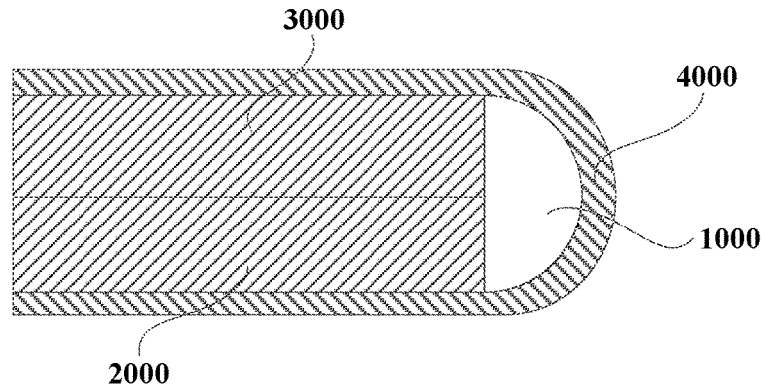
FIG. 5b is a schematic diagram of a structure of an outward-folding electronic device in a folded state.

As described above, the electronic device may be switched between the unfolded state and the folded state through movements of the rotating shaft mechanism 1000, and the flexible display 4000 may be folded or unfolded along with the first housing 2000 and the second housing 3000. Generally, folding types of the foldable electronic device include an outward folding type and an inward folding type. The outward folding type means that when the electronic device is switched from the unfolded state to the folded state and when the electronic device is in the folded state, the flexible display 4000 is located on an outer side of the electronic device. In other words, the flexible display 4000 is still visible to the user in a folding process and in the folded state, and the user may further perform some operations on the flexible display 4000 in the folded state. As described above, the first surface 2001 of the first housing 2000 and the second surface 3001 of the second housing 3000 may move away from each other. When the first housing 2000 and the second housing 3000 are in the folded state, the first surface 2001 of the first housing 2000 and the second surface 3001 of the second housing 3000 are opposite to each other. Refer to FIG. 5*a* and FIG. 5*b*. FIG. 5*a* is a schematic diagram of a structure of an outward folding type electronic device in an unfolded state. FIG. 5*b* is a schematic diagram of a structure of the outward folding type electronic device in a folded state. When the electronic device is in the folded state, the flexible display 4000 is located on the outer side of the electronic device. It may be understood that, if no adjustment is performed, in a folding process (that is, a process from FIG. 5*a* to FIG. 5*b*) of the outward folding type electronic device, a rotation radius of the flexible display 4000 is greater than a rotation radius of the rotating shaft mechanism 1000, resulting in overstretching of the flexible display 4000. Therefore, in a design of the outward folding type rotating shaft mechanism 1000, how to avoid or minimize such stretching needs to be considered.

Figure 6A:
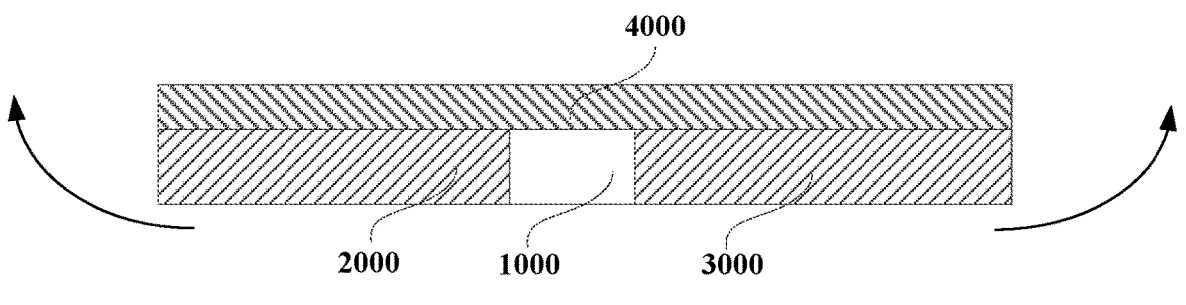
FIG. 6a is a schematic diagram of a structure of an inward-folding electronic device in an unfolded state.
Figure 6B:
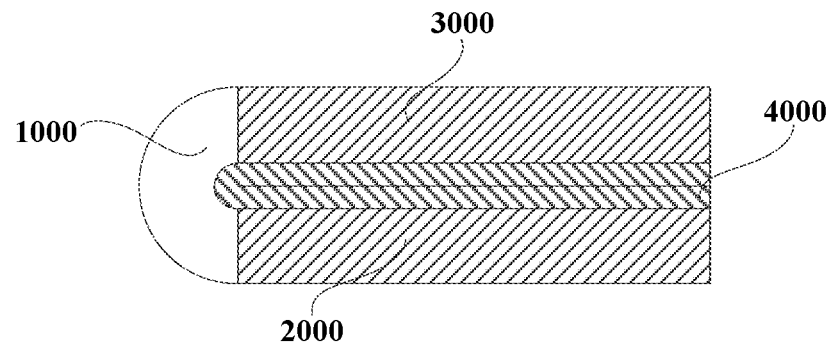
FIG. 6b is a schematic diagram of a structure of an outward-folding electronic device in a folded state.

Correspondingly, the inward folding type means that when the electronic device is switched from an unfolded state to a folded state and when the electronic device is in the folded state, the flexible display 4000 is located on an inner side of the electronic device. In other words, the flexible display 4000 is gradually invisible to the user in a folding process until the flexible display 4000 is accommodated between two housings to be completely hidden in the folded state. As described above, the first surface 2001 of the first housing 2000 and the second surface 3001 of the second housing 3000 may move toward each other. When the first housing 2000 and the second housing 3000 are in the folded state, the first surface 2001 of the first housing 2000 and the second surface 3001 of the second housing 3000 face toward each other. Refer to FIG. 6*a* and FIG. 6*b*. FIG. 6*a* is a schematic diagram of a structure of an inward folding type electronic device in an unfolded state. FIG. 6*b* is a schematic diagram of a structure of the inward folding type electronic device in a folded state. When the electronic device is in the folded state, the flexible display 4000 is located on the inner side of the electronic device. It may be understood that, in a folding process (that is, a process from FIG. 6*a* to FIG. 6*b*) of the inward folding type electronic device, the flexible display 4000 is folded in half. However, a maximum bending degree that the flexible display 4000 may bear is limited. Therefore, there is a corresponding critical curvature radius R (or a critical curvature radius range). Once a curvature radius of a bent position of the flexible display 4000 is less than the critical curvature radius R, the flexible display 4000 is very prone to be broken and may not be used any longer. In addition, even if the curvature radius of the bent position is greater than the critical curvature radius, if a curvature radius of the rotating shaft mechanism 1000 of the electronic device is excessively small, problems such as wrinkles, creases, and internal layer dislocation of the flexible display are caused. Therefore, in a design of the rotating shaft mechanism 1000 of the inward folding type electronic device, the curvature radius of the bent position of the flexible display 4000 needs to be maximized, to reduce extrusion on the flexible display 4000.

It is easy to understand that an increase of spacing between two housings in a folded state may increase the curvature radius, so that the flexible display 4000 may not be directly folded in half. Larger spacing between the two housings indicates a larger curvature radius of the bent position of the flexible display 4000 and smaller extrusion on the flexible display 4000. Smaller spacing between the two housings indicates a smaller curvature radius of the bent position of the flexible display 4000, larger extrusion on the flexible display 4000 and more obvious creases. In addition, the larger spacing between the two housings indicates a larger thickness of the electronic device in the folded state, and this affects portability of the electronic device. In addition, dust, foreign matter, or the like may enter the spacing. This also may damage and abrade the flexible display, which affects a service life of the flexible display, and also affects a service life of the rotating shaft mechanism.

Based on the foregoing problems of the inward folding type foldable electronic device, embodiments of this application provide a foldable electronic device and a rotating shaft mechanism applicable to an electronic device, to improve portability of the electronic device and also provide a large accommodation space for a flexible display 4000 in a folding process and in a folded state. This increases a curvature radius of a bent position of the flexible display 4000, and reduces a risk of extrusion damage to the flexible display 4000.

The following first briefly describes main components and related mechanisms that may be related to the rotating shaft mechanism 1000 provided in this application, and the following further describes a specific structure and an implementation principle of each part in detail.

Figure 7A:
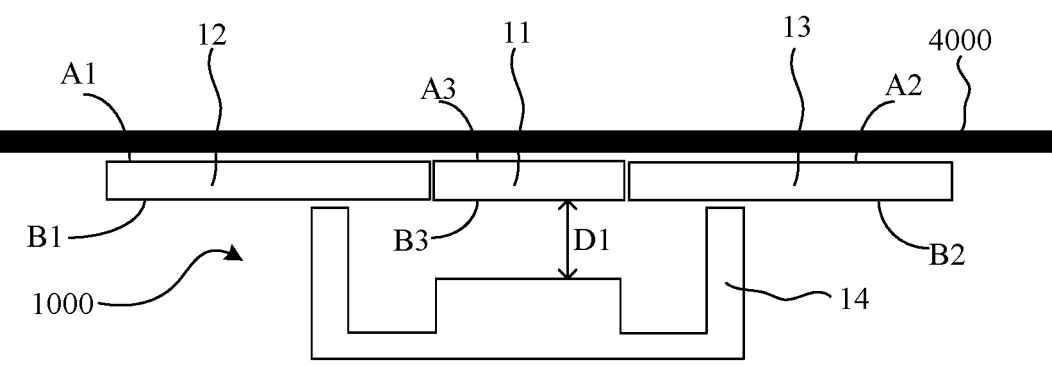
FIG. 7a is a schematic diagram of a state of a flexible display and a rotating shaft mechanism when an electronic device is in an unfolded state according to an embodiment of this application.
Figure 7B:
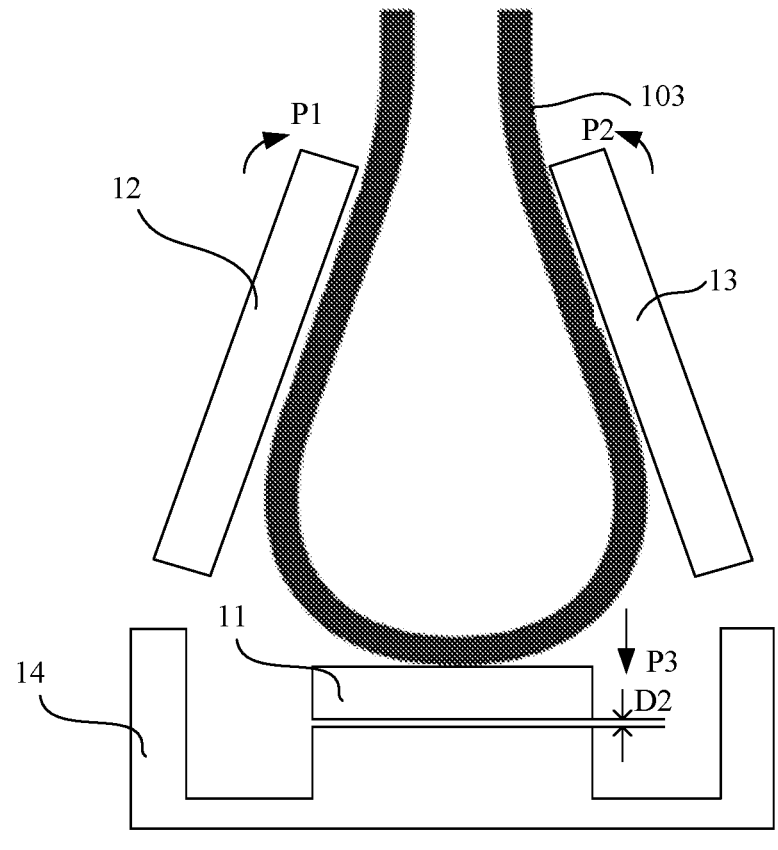
FIG. 7b is a schematic diagram of a state of a flexible display and a rotating shaft mechanism when an electronic device is in a folded state according to an embodiment of this application.

FIG. 7*a* and FIG. 7*b* are simple schematic diagrams of a rotating shaft mechanism 1000 in two different states according to this application. FIG. 7*a* is a schematic diagram of a state of the flexible display 4000 and the rotating shaft mechanism 1000 when the electronic device is in an unfolded state according to an embodiment of this application. FIG. 7*b* is a schematic diagram of a state of the flexible display 4000 and the rotating shaft mechanism 1000 when the electronic device is in a folded state.

Refer to FIG. 7*a* and FIG. 7*b*. The rotating shaft mechanism 1000 provided in this application includes a first support plate 12, a second support plate 13, and a middle support plate 11. The first support plate 12 and the second support plate 13 are disposed on two opposite sides of the middle support plate 11, that is, the middle support plate 11 is placed in between the first support plate 12 and the second support plate 13. The rotating shaft mechanism 1000 further includes a main body 14, and the first support plate 12, the middle support plate 11, and the second support plate 13 are located on a same side of the main body 14. It may be understood that, as shown in FIG. 7*a*, the first support plate 12 has a face A1 and a face B1 that are opposite to each other, the second support plate 13 has a face A2 and a face B2 that are opposite to each other, and the middle support plate 11 has a face A3 and a face B3 that are opposite to each other. The face A1, the face A2, and the face A3 are on a same side, and the face B1, the face B2, and the face B3 are on a same side. The main body 14 is disposed on one side of the face B1, the face B2, and the face B3, and the flexible display 4000 is disposed on the side of the face A1, the face A2, and the face A3.

In the rotating shaft mechanism 1000 provided in this application, the first support plate 12 may rotate relative to the main body 14, the second support plate 13 may also rotate relative to the main body 14, and a rotation direction of the first support plate 12 is opposite to a rotation direction of the second support plate 13. The first support plate 12 and the second support plate 13 that rotate oppositely may include two states. In a first state, when the electronic device is folded, the first support plate 12 and the second support plate 13 rotate toward each other (or referred to as toward each other). In a second state, when the electronic device is unfolded, the first support plate 12 and the second support plate 13 rotate away from each other.

In addition, in the rotating shaft mechanism 1000 provided in this application, in a process of rotating the first support plate 12 and the second support plate 13, the middle support plate 11 may move in a direction close to the main body 14, or move in a direction away from the main body 14.

As shown in FIG. 7*a*, when the electronic device is in the unfolded state, the first support plate 12, the middle support plate 11, and the second support plate 13 are located in a same plane, and are configured to support the unfolded flexible display 4000. When the electronic device changes from the unfolded state to the folded state, as shown in FIG. 7*a* to FIG. 7*b*, the first support plate 12 rotates relative to the main body 14 in a direction of a direction P1, and the second support plate 13 rotates relative to the main body 14 in a direction of a direction P2 that is opposite to the direction of P1. In other words, ends of the first support plate 12 and the second support plate 13 that are away from the main body are close to each other, and ends of the first support plate 12 and the second support plate 13 that are close to the main body are away from each other, so that the flexible display 4000 is bent between the first support plate 12 and the second support plate 13. In addition, in a process in which the first support plate 12 and the second support plate 13 are close to each other relative to the main body 14, the middle support plate 11 moves close to the main body 14 in a direction P3 shown in FIG. 7*b*. For example, a distance between the middle support plate 11 and the main body 14 may be reduced from D1 in FIGS. 7*a* to D2 in FIG. 7*b*. In this way, the first support plate 12, the middle support plate 11, and the second support plate 13 form an accommodating cavity close to a triangle, and the flexible display 4000 is accommodated in the accommodating cavity of the triangle, and may be in a water droplet-like shape. It may be understood in this way that, by moving the middle support plate 11 toward the main body 14, sufficient accommodation space may be yielded for the flexible display 4000, to increase a curvature radius at a bent position of the flexible display 4000, and reduce a risk of being squeezed and damaged of the flexible display 4000.

On the contrary, when the electronic device changes from the folded state to the unfolded state, as shown in FIG. 7*b* to FIG. 7*a*, the first support plate 12 rotates relative to the main body 14 in a direction opposite to the rotation direction P1, and the second support plate 13 rotates relative to the main body 14 in a direction opposite to the direction P2. In other words, the first support plate 12 and the second support plate 13 are away from each other, so that the flexible display 4000 is unfolded. In a process in which the ends of the first support plate 12 and the second support plate 13 that are away from the main body are away from each other relative to the main body 14, the middle support plate 11 moves away from the main body 14 in a direction opposite to the direction P3 shown in FIG. 7*b*, until the first support plate 12, the middle support plate 11, and the second support plate 13 move to a same plane, to support the unfolded flexible display 4000.

Based on the foregoing description of the structure of the rotating shaft mechanism 1000 provided in this application and the description of motion relationships between structures in the rotating shaft mechanism 1000, it may be learned that, in the rotating shaft mechanism 1000 provided in this application, not only the first support plate 12 and the second support plate 13 may rotate relative to the main body 14, but also the middle support plate 11 may rise or fall relative to the main body 14, so that a length of the rotating shaft mechanism 1000 may change. In other words, when the flexible display 4000 is folded, the length of the rotating shaft mechanism 1000 may be extended, to yield more accommodation space for the flexible display 4000, and the curvature radius at the bent position of the flexible display 4000 is increased, to avoid extrusion on a part of the flexible display 4000 close to the rotating shaft mechanism 1000. When the flexible display 4000 is unfolded, the length of the rotating shaft mechanism 1000 may be shortened. In other words, the rotating shaft mechanism 1000 may enable the flexible display 4000 to be basically unchanged in a length size when the flexible display 4000 is at any angle in the folding process, that is, the flexible display 4000 may not be squeezed or stretched.

Figure 8:
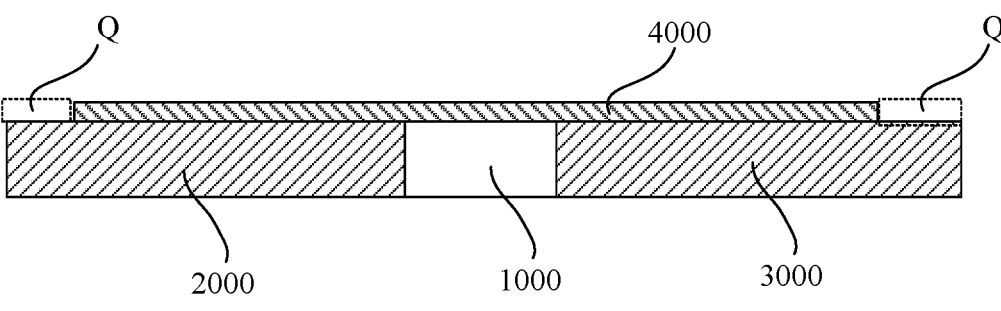
FIG. 8 is a schematic diagram of a structure of a rotating shaft mechanism when an electronic device is in an unfolded state in a current technology.

In some existing implementations, FIG. 8 is a simple schematic diagram of an existing electronic device. In this electronic device, the flexible display 4000 is disposed on the first housing 2000 and the second housing 3000 in a sliding manner. If the electronic device is folded for a plurality of times, the flexible display 4000 may be worn or even damaged due to a plurality of times of sliding. However, in the electronic device provided in this application, a part of the flexible display 4000 is fastened to the first housing 2000, and another part of the flexible display 4000 is fastened to the second housing 3000. In comparison with the flexible display 4000 disposed in the sliding manner shown in FIG. 8, in this application, a degree to which the flexible display 4000 is worn is obviously reduced, to increase a quantity of folding times of the flexible display, increase a service life of the flexible display 4000, and improve use performance of the electronic device.

Still with reference to FIG. 8, the flexible display 4000 is disposed on the first housing 2000 and the second housing 3000 in a sliding manner. Therefore, edges of the first housing 2000 and the second housing 3000 have an exposed area (a Q area shown in FIG. 8) that is used to accommodate sliding space of the flexible display 4000. In this way, screen portions of the flexible display 4000 on the first housing 2000 and the second housing 3000 are reduced. However, in comparison with the structure shown in FIG. 8, the first housing 2000 and the second housing 3000 provided in this application do not need to be configured with a Q area. When the size of the electronic device is equivalent to that shown in FIG. 8, this application may provide a flexible display 4000 with a larger area, to provide a larger display area.

Figures 9, 10:
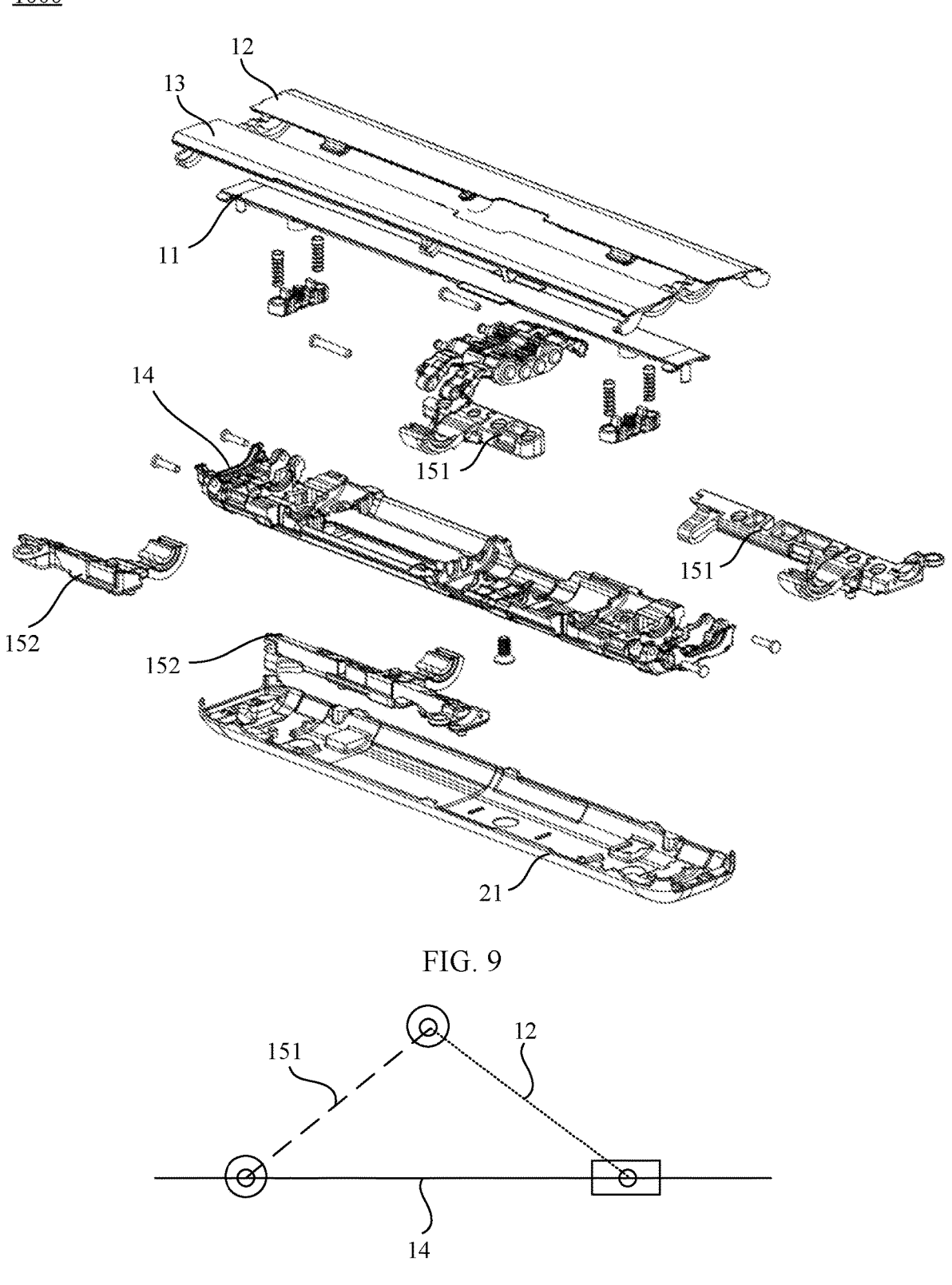
FIG. 9 is an exploded view of a rotating shaft mechanism according to an embodiment of this application.
FIG. 10 is a principle diagram of a slider-crank formed by a first swing arm, a main body, and first support plate in a rotating shaft mechanism according to an embodiment of this application.

FIG. 9 shows an implementable structure of a rotating shaft mechanism 1000. FIG. 9 is an exploded view of the rotating shaft mechanism 1000. In addition to the first support plate 12, the second support plate 13, the middle support plate 11, and the main body 14, the rotating shaft mechanism 1000 further includes a first swing arm 151 and a second swing arm 152. The first swing arm 151 and the second swing arm 152 are disposed on two opposite sides of the support plate main body 14.

An end of the first swing arm 151 is rotatably connected to the main body 14, the other end of the first swing arm 151 is relatively fastened to the first housing 2000, one end of the first support plate 12 is rotatably connected to the first swing arm 151, and the other end of the first support plate 12 is slidably connected to the main body 14. An end of the second swing arm 152 is rotatably connected to the main body 14, the other end of the second swing arm 152 is relatively fastened to the second housing 3000, an end of the second support plate 13 is rotatably connected to the second swing arm 152, and the other end of the second support plate 13 is slidably connected to the main body 14.

With reference to FIG. 10, the main body 14, the first swing arm 151, and the first support plate 12 form a slider-crank. When an external force acts on the first swing arm 151 to make the first swing arm 151 rotate relative to the main body 14, because the first support plate 12 and the first swing arm 151 implement rotation coordination, and the first support plate 12 and the main body 14 implement sliding coordination, when the first swing arm 151 rotates from a position A1 of the solid line to a position A2 of the dashed line in a clockwise direction shown in FIG. 11, the first support plate 12 also moves from a position B1 of the solid line to a position B2 of the dashed line. In this way, when the first swing arm 151 rotates relative to the main body 14, the first support plate 12 is driven to rotate relative to the main body 14. To be specific, in addition, the first swing arm 151 drives the first support plate 12 to rotate, so that the first support plate 12 slides relative to the main body 14 along a direction perpendicular to a rotation axis of the first swing arm 151, which drives an end that is of the first support plate 12 and that is close to the main body 14 to move along a direction away from the main body 14.

Figure 11:
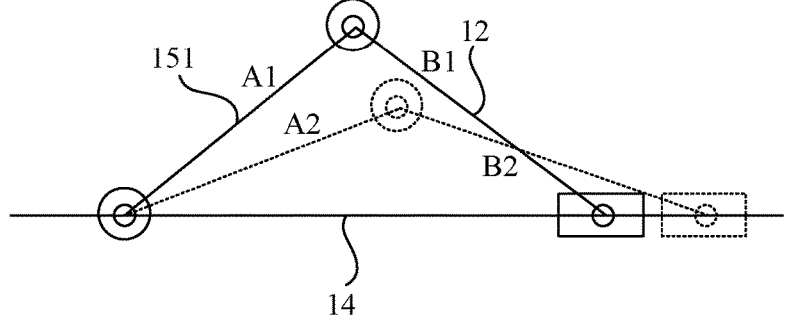
FIG. 11 is a schematic diagram of a state at a moment when a slider-crank formed by a first swing arm, a main body, and a first support plate slides during movement according to an embodiment of this application.

Similarly, the main body 14, the second swing arm 152, and the second support plate 13 also form a slider-crank, which is the same as that in FIG. 10 and FIG. 11. To be specific, when an external force acts on the second swing arm 152 to make the second swing arm 152 rotate relative to the main body 14, because the second support plate 13 and the second swing arm 152 implement rotation coordination, and the second support plate 13 and the main body 14 implement sliding coordination, when the second swing arm 152 rotates, the second support plate 12 is also driven to rotate.

In some implementations, there may be one or more first swing arms 151, and there may also be one or more second swing arms 152. In this embodiment of this application, FIG. 9 shows a rotating shaft mechanism 1000 including two first swing arms 151 and two second swing arms 152. When there are a plurality of first swing arms 151 and a plurality of second swing arms 152, the first swing arm 151 and the second swing arm 152 may be disposed at intervals.

The following specifically describes a connection structure between structures of the first support plate 12, the first swing arm 151, and the main body 14. For a connection structure between the second support plate 13, the second swing arm 152, and the main body 14, refer to descriptions of the connection structure between the structures of the first support plate 12, the first swing arm 151, and the main body 14.

A rotating connection between the first swing arm 151 and the main body 14 has a plurality of implementable structures. The following provides three different rotating connection structures. Certainly, in addition to the mentioned structures, another rotating connection structure may also be used.

Figure 12:
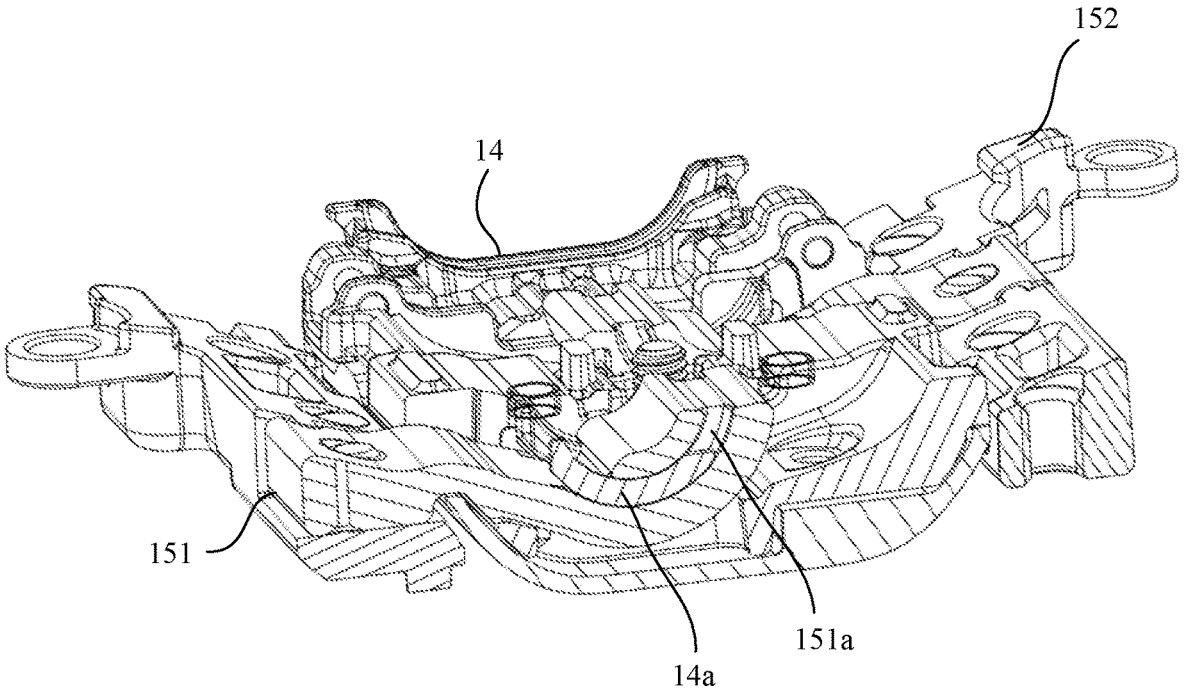
FIG. 12 is a schematic diagram of a connection relationship between a first swing arm and a second swing arm when being unfolded according to an embodiment of this application.

Example 1: FIG. 12 shows a rotating connection structure. In this embodiment of this application, an arc-shaped first arc-shaped bump 14a is disposed on the main body 14, a first arc-shaped slot 151a is disposed at an end that is of the first swing arm 151 and that is close to the main body 14, the first arc-shaped bump 14a is assembled in the first arc-shaped slot 151a, and the first arc-shaped bump 14a rotates relative to the first arc-shaped slot 151a. In this way, rotation between the first swing arm 151 and the main body 14 may be implemented.

Figure 13:
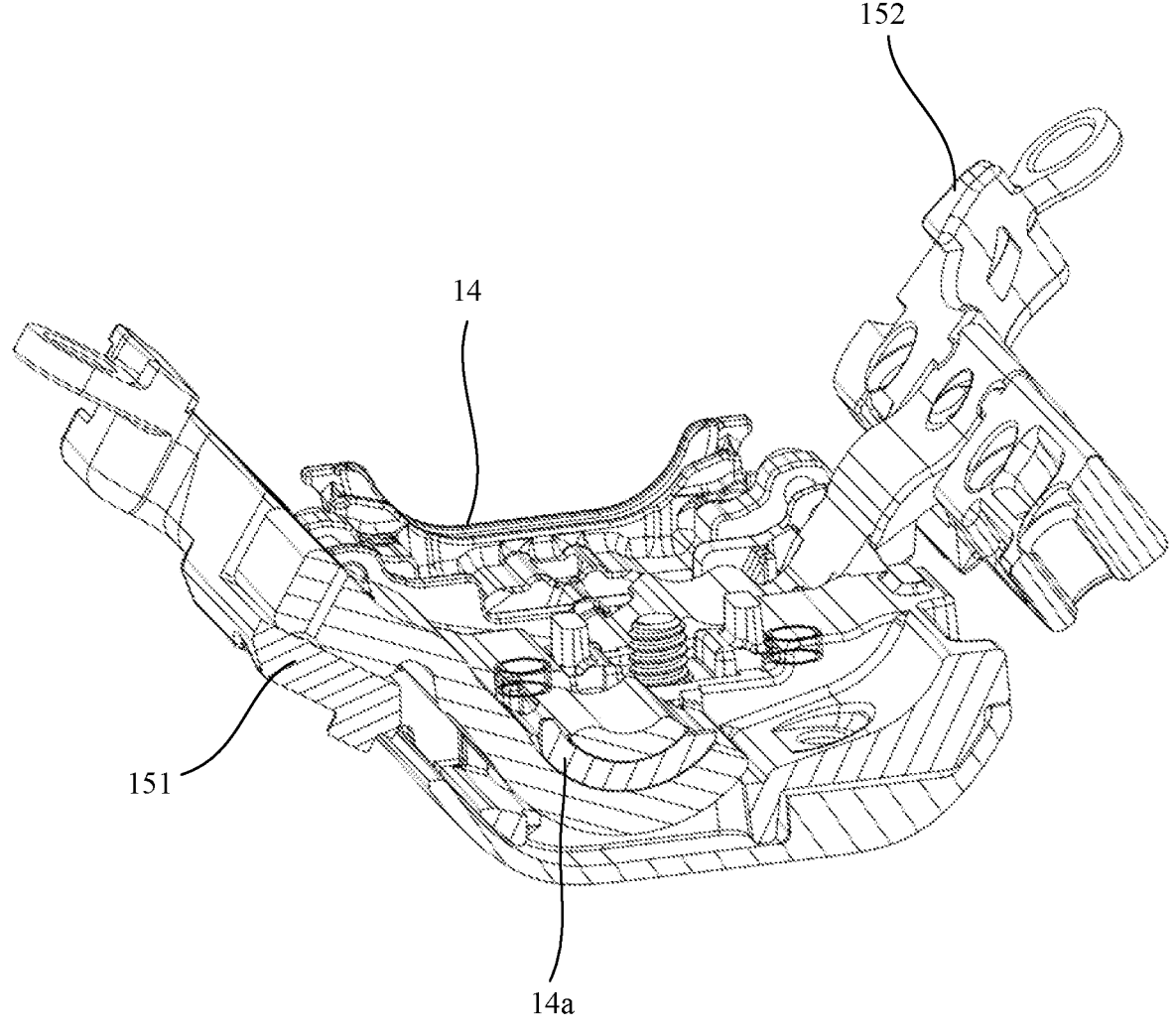
FIG. 13 is a schematic diagram of a connection relationship between a first swing arm and a second swing arm at a position between being unfolded and folded according to an embodiment of this application.
Figure 14:
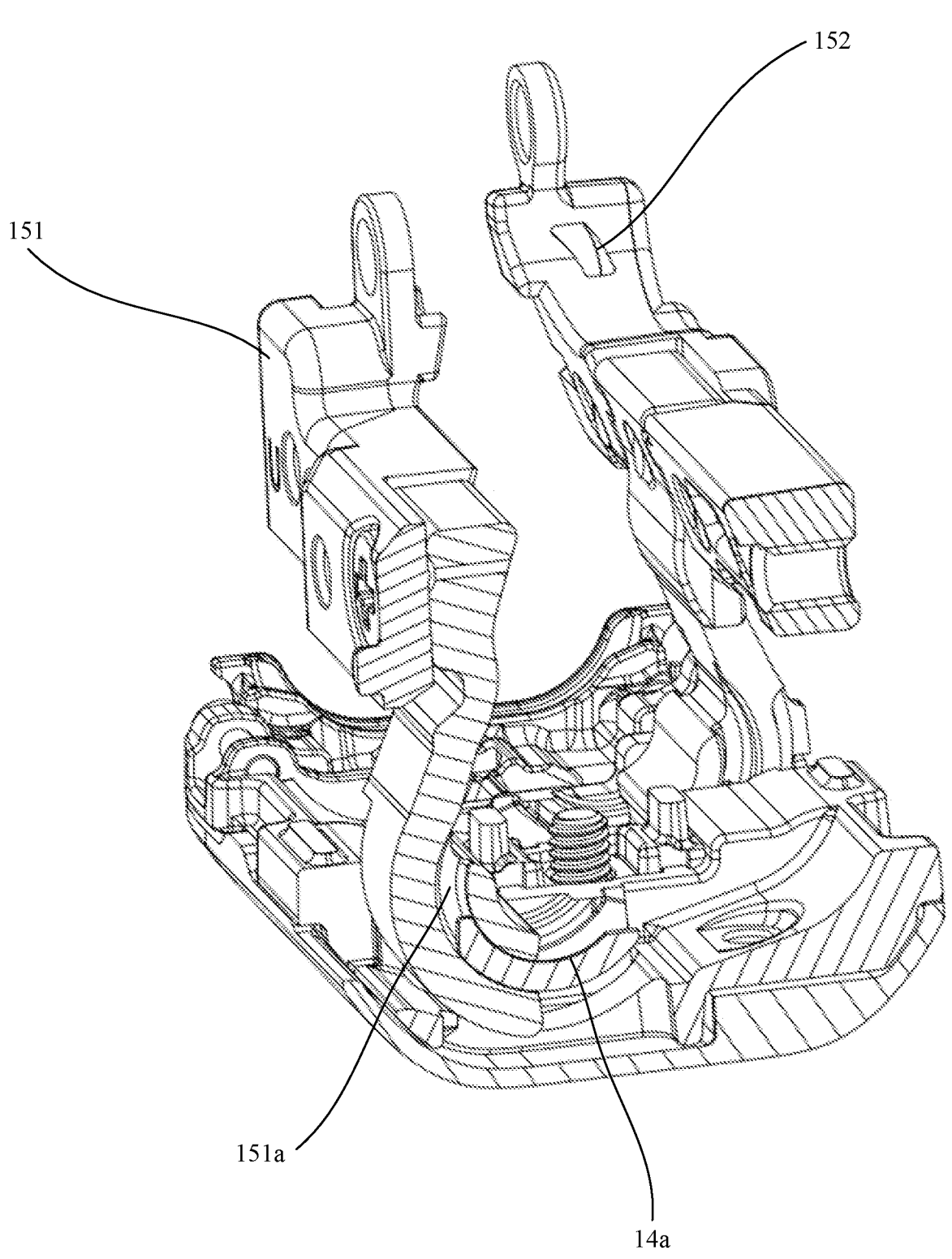
FIG. 14 is a schematic diagram of a connection relationship between a first swing arm and a second swing arm when being folded according to an embodiment of this application.
Figure 15:
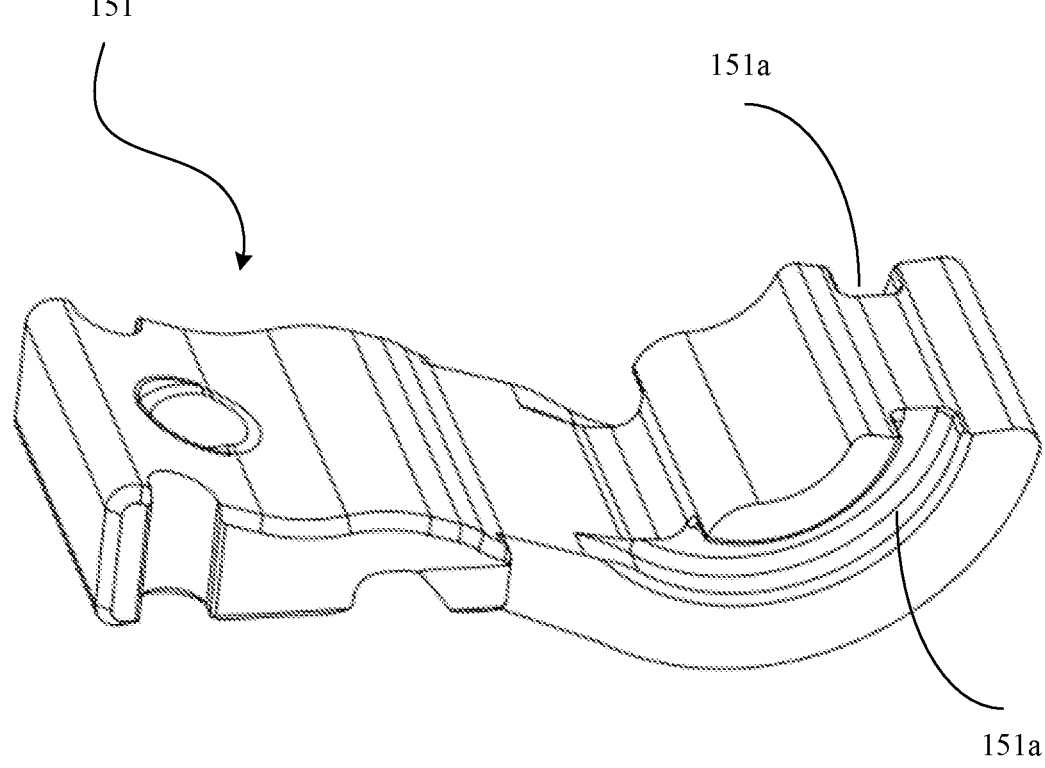
FIG. 15 is a schematic diagram of a structure of a part of a first swing arm according to an embodiment of this application.
Figure 16:
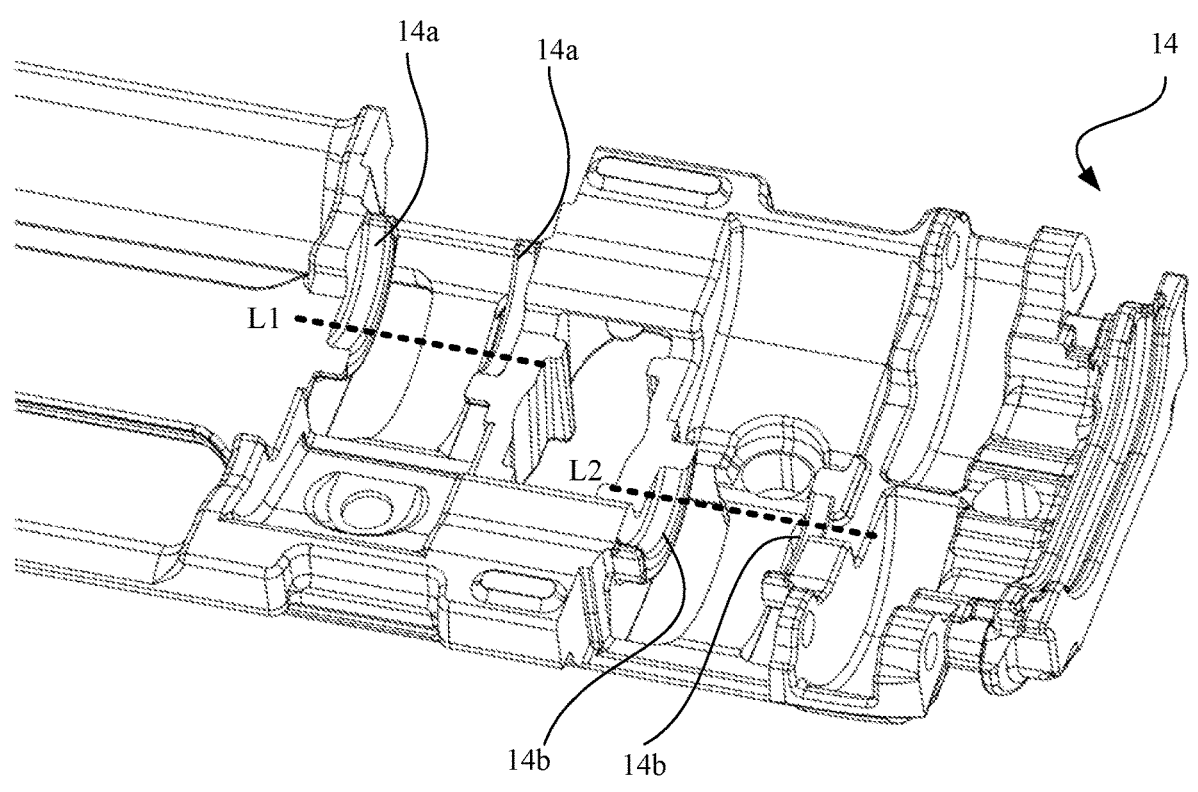
FIG. 16 is a schematic diagram of a structure of a part of a main body according to an embodiment of this application.

FIG. 12 shows a position relationship between the first swing arm 151 and the main body 14 and the second swing arm 152 when the electronic device is in the unfolded state. FIG. 13 shows a position relationship between the first swing arm 151 and the main body 14 and the second swing arm 152 when the electronic device is in an intermediate state. In a process in which the electronic device is folded from FIG. 12 to FIG. 13, an end portion that is of the first swing arm 151 and that is away from the main body 14 and an end portion that is of the second swing arm 152 and that is away from the main body 14 are gradually away from the main body 14. FIG. 14 shows a position relationship between the first swing arm 151 and the main body 14 and the second swing arm 152 when the electronic device is in the folded state. In a process in which the electronic device continues to be folded from FIG. 13 to FIG. 14, the end portion that is of the first swing arm 151 and that is away from the main body 14 and the end portion that is of the second swing arm 152 and that is away from the main body 14 are further away from the main body 14. FIG. 15 shows a schematic diagram of a part of a structure of the first swing arm 151. To improve rotation stability of the first swing arm 151 and the main body 14, as shown in FIG. 15, the first swing arm 151 is provided with two first arc-shaped slots 151*a* symmetrically disposed on two sides. FIG. 16 shows a schematic diagram of a part of a structure of the main body 14. Correspondingly, as shown in FIG. 16, the main body 14 is provided with two first arc-shaped bumps 14*a*, and the two first arc-shaped slots 151*a* are connected to the two first arc-shaped bumps 14*a* in a one-to-one correspondence.

Still refer to FIG. 15 and FIG. 16, the end portions of the first swing arm 151 are placed in between the two first arc-shaped bumps 14*a*. In this way, the two first arc-shaped bumps 14*a* also play a role of limiting a position. Specifically, when the first swing arm 151 and the main body 14 rotate toward each other, the first swing arm 151 may be prevented from fluttering along the rotation axis direction (for example, a direction L1 in FIG. 16), so that the first swing arm 151 may rotate stably relative to the main body 14. Further, it may be ensured that the flexible display 4000 does not deviate along the rotation axis direction when the flexible display 4000 is folded or unfolded, which improves user experience of the electronic device.

When the rotating connection structure shown in FIG. 15 and FIG. 16 is used, the first arc-shaped slot 151*a* may be a quarter-arc slot, a third-arc slot, or the like. The first arc-shaped bump 14*a* may be a quarter-arc bump, a third-arc bump, or the like. A person skilled in the art may adaptively adjust specific parameters of the first arc-shaped slot 151*a* and the first arc-shaped bump 14*a* based on an actual requirement. This is not specifically limited in this application.

Example 2: A first arc-shaped bump may be disposed on the first swing arm 151, and a first arc-shaped slot is disposed on the main body 14. The first arc-shaped bump on the first swing arm 151 matches with the first arc-shaped slot on the main body 14, to implement relative rotation of the first swing arm 151 and the main body 14. To be specific, in comparison with Example 1, in Example 2, positions at which the first arc-shaped bump and the first arc-shaped slot are disposed are exchanged, so that a same rotating connection effect may be implemented. Therefore, a structure of the first arc-shaped bump and the first arc-shaped slot may be disposed with reference to Example 1. Details are not described herein again.

Example 3: The first swing arm 151 and the main body 14 may be rotatably connected by using a rotation axis. For example, a shaft hole is disposed on both the main body 14 and the first swing arm 151, and a rotation axis inserted into the shaft hole is used to rotatably connect the main body 14 and the first swing arm 151.

For a rotation structure of the second swing arm 152 and the main body 14, reference may be made to the rotation structure of the first swing arm 151 and the main body 14. Certainly, another structure may also be selected to implement rotation. For example, FIG. 16 shows that an arc-shaped second arc-shaped bump 14*b* is disposed on the main body 14. Correspondingly, a second arc-shaped slot configured to assemble the second arc-shaped bump 14*b* is disposed on the second swing arm 152.

It should be noted that, to ensure that the flexible display 4000 may be symmetrically folded and unfolded, a rotation axis of the second swing arm 152 on the main body 14 may be disposed in parallel to a rotation axis of the first swing arm 151 on the main body 14. For example, as shown in FIG. 16, a rotation axis L1 around which the first arc-shaped slot 151*a* rotates and the first arc-shaped bump 14*a* implement rotation coordination is parallel to a rotation axis L2 around which the second arc-shaped bump 14*b* and the second arc-shaped slot implement rotation coordination.

Figure 17:
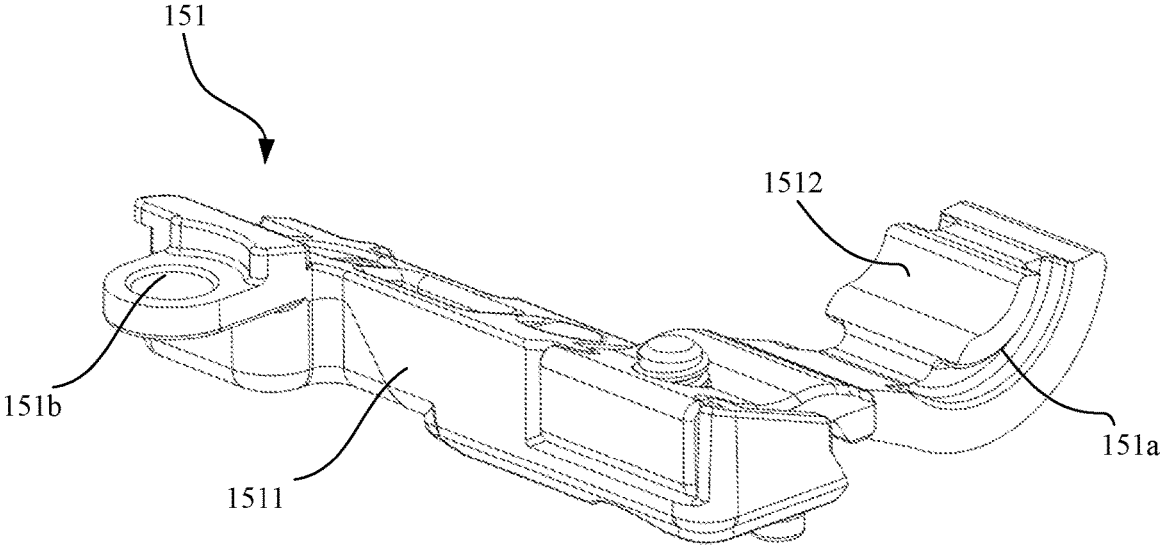
FIG. 17 is a schematic diagram of a structure of a first swing according to an embodiment of this application.

Structures of the first swing arm 151 and the second swing arm 152 have a plurality of implementable structures. For example, as shown in FIG. 17, FIG. 17 shows an implementable structure of the first swing arm 151. The first swing arm 151 includes a support 1511 and an arc arm 1512 of an arc structure. The support 1511 and the arc arm 1512 may be two independent parts, and are relatively fastened by using a connecting component such as a bolt. In another possible design, the support 1511 and the arc arm 1512 may also be an integrally formed structure.

The first arc-shaped slot 151*a* may be disposed on the arc arm 1512, and the support 1511 may be fastened to the first housing 2000. For example, as shown in FIG. 17, a mounting hole 151*b* may be disposed on the support 1511, and the first housing 101 is fastened to the support 1511 of the first swing arm 151 by using a connecting component such as a staple installed in the mounting hole 151*b*.

To simplify a manufacturing process, the second swing arm 152 may be of a same structure as the first swing arm 151. Certainly, the first swing arm 151 and the second swing arm 152 may also use another type of structure.

Figure 18:
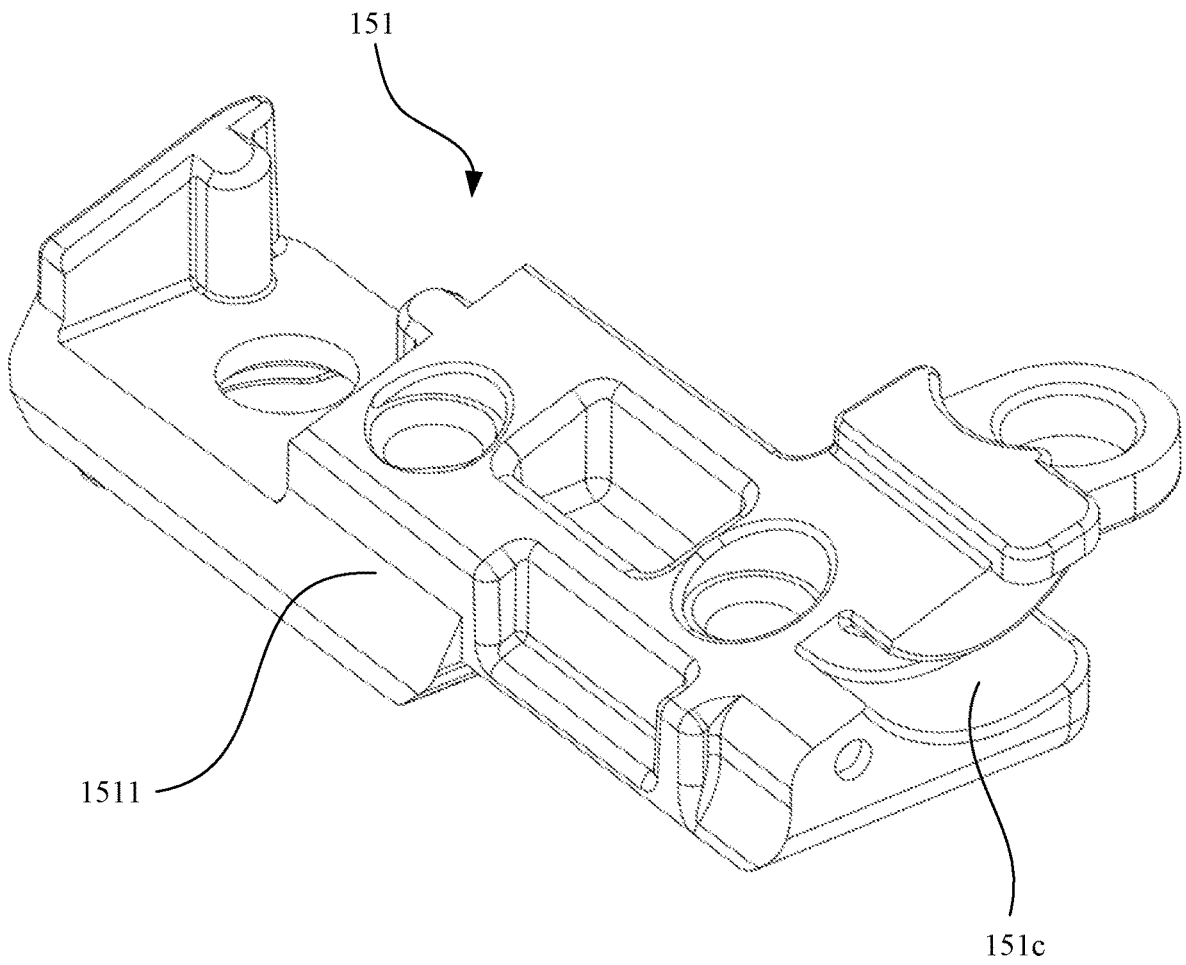
FIG. 18 is a schematic diagram of a structure of a part of a first swing arm according to an embodiment of this application.
Figures 19, 20:
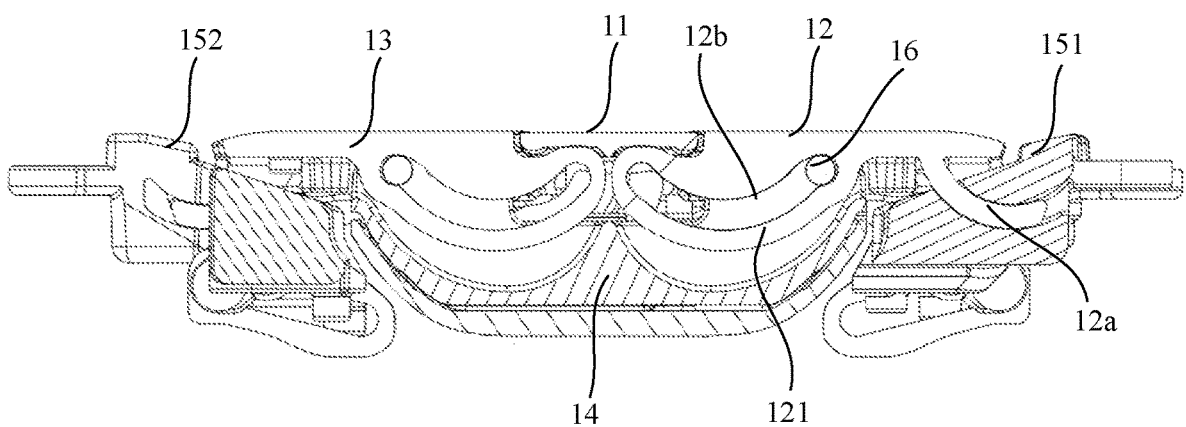
FIG. 19 is a schematic diagram of a structure of a first support plate according to an embodiment of this application.
FIG. 20 is a schematic diagram of a connection relationship between a first support plate, a first swing arm, and a second support plate when being unfolded according to an embodiment of this application.

That the first support plate 12 is rotatably connected to the first swing arm 151 also has a plurality of implementable structures. For example, as shown in FIG. 18, FIG. 18 is a schematic diagram of a part of the structure of the first swing arm 151. A third arc-shaped slot 151*c* is disposed on the first swing arm 151. FIG. 19 is a schematic diagram of a structure of a first support plate 12. The first support plate 12 is a board body structure, and the first support plate 12 has a first face (a face A1) and a second face (a face B1) that are opposite to each other. A first support plate arc-shaped bump 12*a* is disposed on a side of the first support plate 12 opposite to the main body 14. With reference to FIG. 7*a* and FIG. 19, the first support plate arc-shaped bump 12*a* may be disposed on the face B1 of the first support plate 12. The first support plate arc-shaped bump 12*a* is assembled in the third arc-shaped slot 151*c*, so that the first swing arm 151 and the first support plate 12 may be rotatably connected. To ensure relative rotation stability of the first support plate 12 and the first swing arm 151, as shown in FIG. 19, a plurality of first support plate arc-shaped bumps 12*a* may be disposed on the first support plate 12, and the plurality of first support plate arc-shaped bumps 12*a* are connected to a plurality of first swing arms 151 in a one-to-one manner. In some other optional implementations, a rotation axis may also be used for rotatable connection.

When the first swing arm 151 includes the support 1511 and the arc arm 1512 having an arc-shaped structure, the arc arm 1512 is close to the main body 14 and is rotatably connected to the main body 14. In this case, as shown in FIG. 18, the third arc-shaped slot 151*c* may be disposed on the support 1511 away from the main body 14. A rotation direction of the first support plate 12 around the support 1511 may be the same as a rotation direction of the support 1511. For example, when the support 1511 rotates clockwise, the first support plate 12 rotates clockwise around the support 1511; or when the support 1511 rotates counter-clockwise, the first support plate 12 rotates counter-clockwise around the support 1511.

Similarly, for a rotatable connection structure between the second support plate 13 and the second swing arm 152, refer to the rotatable connection structure between the first support plate 12 and the first swing arm 151. Details are not described herein again.

To implement a slidable connection between the first support plate 12 and the main body 14, FIG. 20 shows a connection relationship between the first support plate 12 and the first swing arm 151, and a connection relationship between the first support plate 12 and the main body 14 when the electronic device is in an unfolded state, and further shows a connection relationship between the second support plate 13 and the second swing arm 152 and a connection relationship between the second support plate 13 and the main body 14. Refer to FIG. 19 and FIG. 20. An extension portion 121 is disposed on a side of the first support plate 12 opposite to the main body 14, the extension portion 121 extends toward a side that is of the middle support plate 11 and that is close to the main body 14, and a first support plate sliding slot 12b is disposed on the extension portion 121. Specifically, the extension portion 121 may be disposed on the face B2 of the first support plate 12, the extension portion 121 extends toward a side that is of the middle support plate 11 and that is close to the main body 14, and a first support plate sliding slot 12b is disposed on the extension portion 121. A sliding shaft 16 is assembled in a first support plate chute 12b, and the sliding shaft 16 is relatively fastened to the main body 14. A slidable connection between the first support plate 12 and the main body 14 is implemented by sliding coordination between the sliding shaft 16 and the first support plate chute 12b. In the structure shown in FIG. 20, a slidable connection between the sliding shaft 16 and the first support plate chute 12b is implemented by sliding coordination between the sliding shaft 16 and the first support plate chute 12b. In some other embodiments, a sliding block that may slide along the first support plate chute 12b of the first support plate 12 may also be disposed on the main body 14, and the sliding block and the main body 14 may be designed as an integrated structure.

Similarly, for a slidable connection structure between the second support plate 13 and the main body 14, refer to the slidable connection structure between the first support plate 12 and the main body 14. Details are not described herein again. For example, a sliding coordination structure of the sliding shaft and the sliding slot in FIG. 19 and FIG. 20 may also be used.

Figure 21:
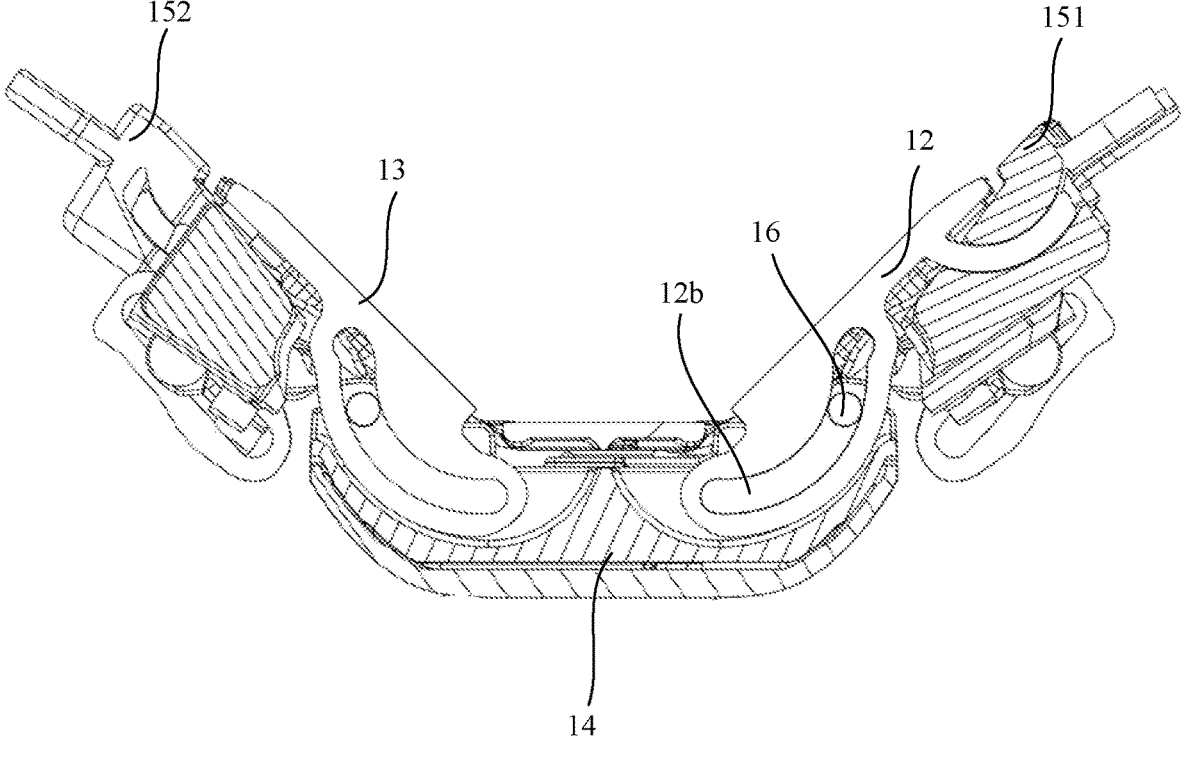
FIG. 21 is a schematic diagram of a connection relationship between a first support plate, a first swing arm, and a second support plate at a position between being unfolded and folded according to an embodiment of this application.
Figure 22:
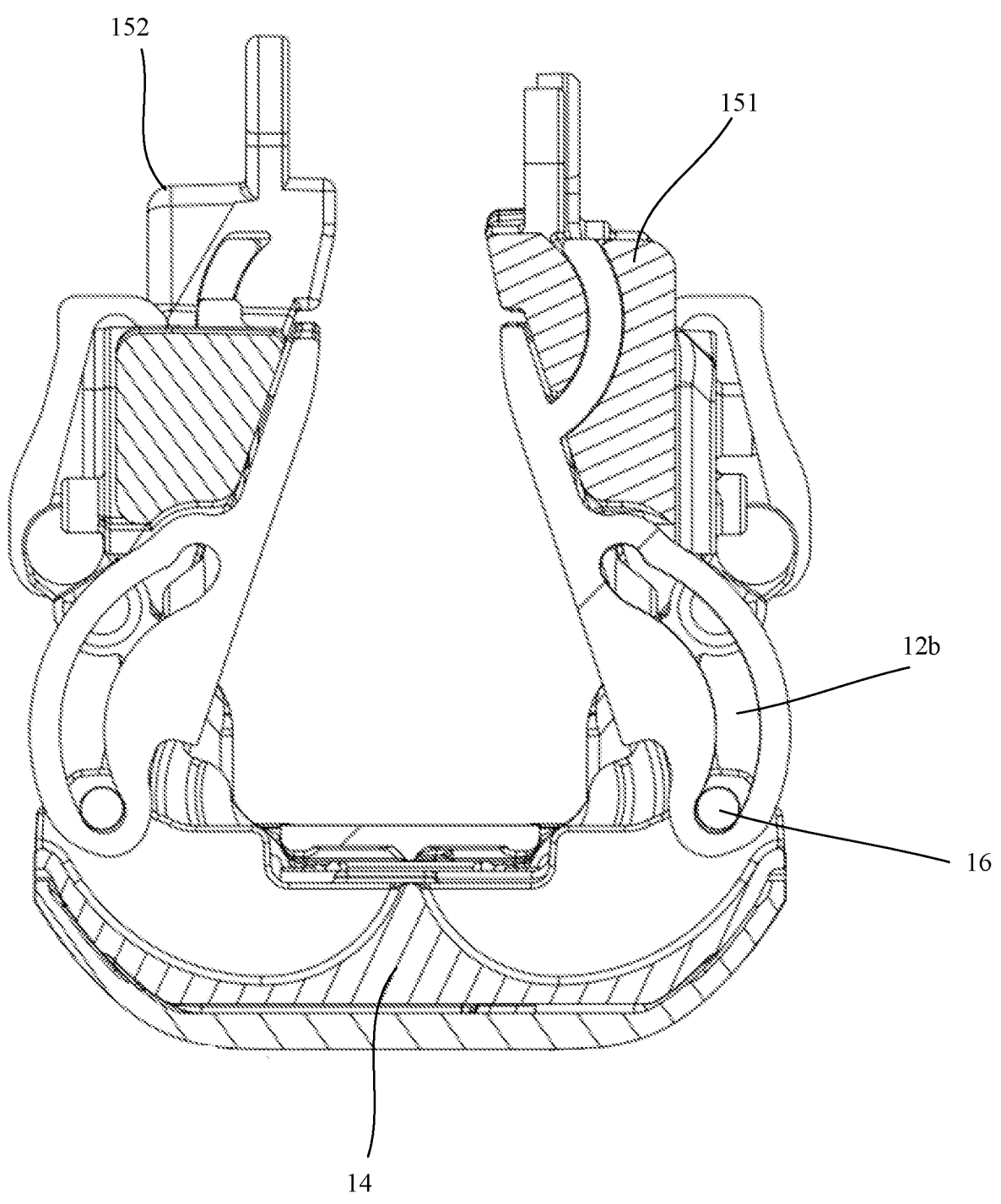
FIG. 22 is a schematic diagram of a connection relationship between a first support plate, a first swing arm and a second support plate when being folded according to an embodiment of this application.

FIG. 20 also shows positions of the first swing arm 151, the second swing arm 152, the first support plate 12, and the second support plate 13 when the electronic device is in an unfolded state. FIG. 21 shows positions of the first swing arm 151, the second swing arm 152, the first support plate 12, and the second support plate 13 when the electronic device is folded to an intermediate state. It may be seen from comparison between FIG. 20 and FIG. 21 that the first swing arm 151 and the second swing arm 152 rotate toward each other, and the sliding shaft 16 moves along the first support plate sliding slot 12b, so that the first support plate 12 and the second support plate 13 also rotate toward each other. FIG. 22 shows positions of the first swing arm 151, the second swing arm 152, the first support plate 12, and the second support plate 13 when the electronic device is in a folded state. In this case, the sliding shaft 16 slides to an end portion of the first support plate sliding slot 12b and abut against a corresponding support plate. It may be learned that in a process in which the electronic device switches from the unfolded state to the folded state, the sliding shaft 16 slides from an end that is of the first support plate chute 12b and that is away from the main body 14 to an end that is of the first support plate chute 12b and that is close to the main body 14.

Figure 23A:
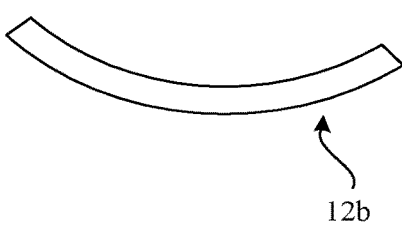
FIG. 23a is a schematic diagram of a structure of a first support plate sliding slot disposed on a first support plate according to an embodiment of this application.
Figure 23B:
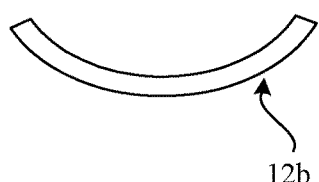
FIG. 23b is a schematic diagram of a structure of another first support plate sliding slot disposed on a first support plate according to an embodiment of this application.
Figure 23C:
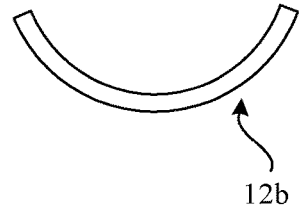
FIG. 23c is a schematic diagram of a structure of still another first support plate sliding slot disposed on a first support plate according to an embodiment of this application.

The first support plate sliding slot 12b may be disposed in different structures. For example, FIG. 23a, FIG. 23b, and FIG. 23c show three different arc-shaped first support plate sliding slots 12b. From FIG. 23a to FIG. 23c, bending radiuses of the first support plate sliding slots 12b gradually decrease. When the bending radius of the first support plate chute 12b is relatively small, when the electronic device is folded or unfolded, a rotation speed of the support plate (the first support plate 12 or the second support plate 13) is greater. Therefore, when the rotating shaft mechanism is designed, the bending radius of the first support plate chute 12b may be selected according to a rotation speed requirement of the support plate. In some other possible implementations, the first support plate sliding slot 12b may also be a structure of another form, for example, a linear form or a bent form.

When the first support plate 12 and the second support plate 13 rotate relative to the main body 14, the middle support plate 11 located between the first support plate 12 and the second support plate 13 needs to move relative to the main body 14, so that a length size of the rotating shaft mechanism 1000 is changed, and the flexible display 4000 is prevented from being squeezed or stretched. In this case, the rotating shaft mechanism 1000 may further include a drive structure configured to drive the middle support plate 11 to move. When the first support plate 12 and the second support plate 13 rotate toward each other, the drive structure drives the middle support plate 11 to move in a direction close to the main body 14. When the first support plate 12 and the second support plate 13 rotate away from each other, the drive structure drives the middle support plate 11 to move in a direction away from the main body 14.

It may be said that when the first support plate 12 and the second support plate 13 rotate toward each other relative to the main body 14 until the electronic device is in the folded state, the drive structure drives the middle support plate 11 to move to a first position close to the main body 14. In this way, the length of the entire rotating shaft mechanism 1000 is increased. At the first position, the first support plate 12 and the second support plate 13 form a preset included angle, and the first support plate 12, the middle support plate 11, and the second support plate 13 form an accommodating cavity similar to a triangle, to yield accommodation space for the flexible display 4000 close to the rotating shaft mechanism 1000, and ensure that a length of the flexible display 4000 remains unchanged in a folding process. When the first support plate 12 and the second support plate 13 rotate away from the main body 14 until the electronic device is in an unfolded state, the drive structure drives the middle support plate 11 to move to a second position away from the main body 14, to shorten the length size of the entire rotating shaft mechanism 1000. At the second position, the first support plate 12, the middle support plate 11, and the second support plate 13 are in a same plane, so that the flexible display 4000 is flatly located on them.

Figure 24:
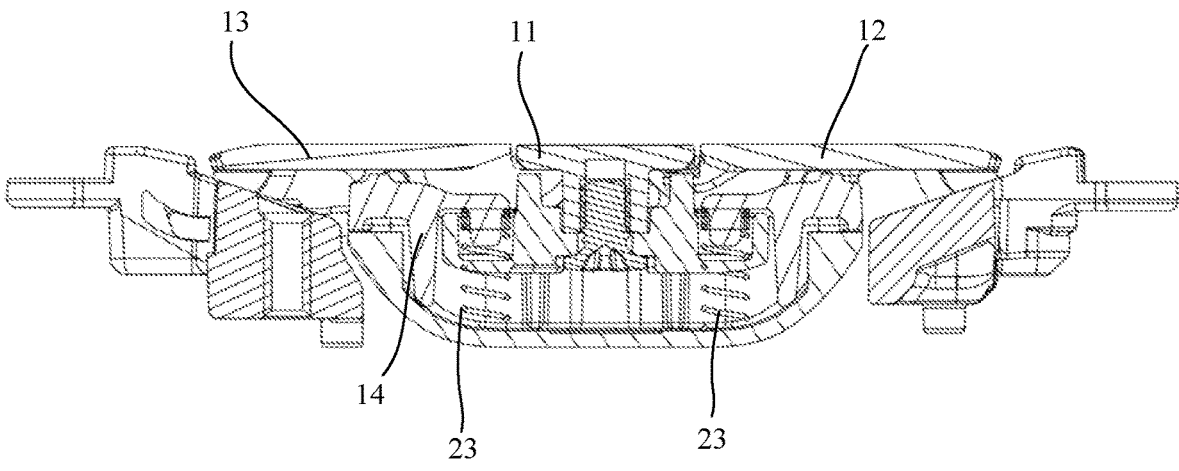
FIG. 24 is a schematic diagram of a connection relationship between a middle support plate, a main body, and a traction element according to an embodiment of this application.

The rotating shaft mechanism 1000 provided in this application further includes a retractable traction element. FIG. 24 is a sectional view of the rotating shaft mechanism 1000, and is used to reflect a connection relationship between the main body 14, the middle support plate 11, and the retractable traction element 23. An end of the traction element 23 is fastened to the middle support plate 11, and the other end of the traction element 23 is fastened to the main body 14. When the middle support plate 11 moves relative to the main body 14, the retractable traction element 23 may apply an acting force toward the main body 14 to the middle support plate 11, to drive the middle support plate 11 to move toward the main body 14.

To make a pulling force of the traction element 23 symmetrical to the middle support plate 11, as shown in FIG. 24, a plurality of traction elements 23 may be used, and the plurality of traction elements 23 are symmetrically disposed on sides of the middle support plate 11.

The retractable traction element 23 has a plurality of optional structures. For example, as shown in FIG. 24, the traction element 23 is a spring. Certainly, another traction element may alternatively be selected.

There are a plurality of implementations for the drive structure that enables the middle support plate 11 to move toward a direction away from the main body 14. In some optional implementations, the drive structure may be an electric drive structure (for example, a linear motor), a hydraulic drive structure (for example, a hydraulic cylinder), or an air pressure drive structure (for example, a cylinder). In some other implementations, in a process of folding and unfolding the electronic device, the first support plate 12, the second support plate 13, the first swing arm 151, and the second swing arm 152 all generate relative motion with the middle support plate 11. Therefore, in a possible embodiment of this application, one or more of the moving first support plate 12, the second support plate 13, the first swing arm 151, and the second swing arm 152 may be used to generate an acting force on the middle support plate 11, so that the middle support plate 11 moves away from the main body 14. In this way, a structure of the entire rotating shaft mechanism 1000 may be simplified, and it is convenient to implement. The following specifically describes how at least one of the first support plate 12, the second support plate 13, the first swing arm 151, and the second swing arm 152 is used as the drive structure to drive the middle support plate 11 to move relative to the main body 14.

Figure 25:
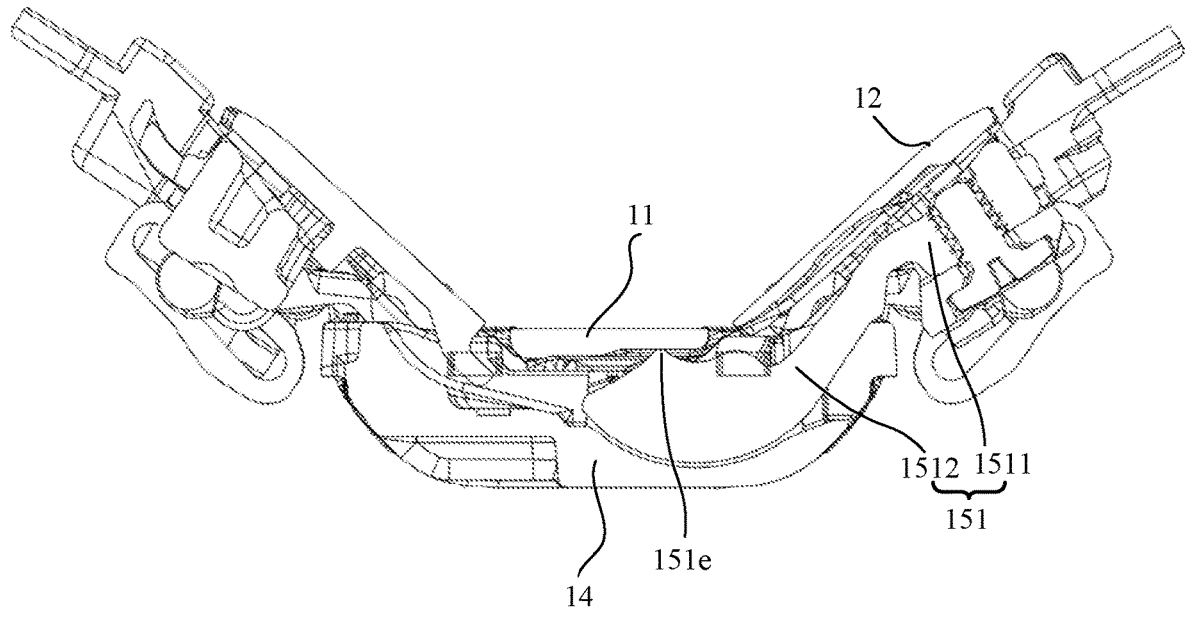
FIG. 25 is a schematic diagram of a connection relationship in which a first swing arm drives a middle support plate to move according to an embodiment of this application.

In a process of unfolding or folding the electronic device, any one of the first support plate 12, the second support plate 13, the first swing arm 151, and the second swing arm 152 rotates relative to the main body 14. In this case, at least one of these rotating structures may be used to apply an acting force to the middle support plate 11, to drive the middle support plate 11 to move. For example, FIG. 25 is a schematic diagram of a structure in which the first swing arm 151 drives the middle support plate 11 to move in a direction away from the main body 14. To be specific, in a process in which the electronic device moves from the folded state to the unfolded state, an end portion that is of the first swing arm 151 and that is close to the main body 14 forms a support portion 151*e*, and the support portion 151*e* abuts against a side that is of the middle support plate 11 and that is close to the main body 14. As the first swing arm 151 rotates, the support portion 151*e* pushes the middle support plate 11 to move in the direction away from the main body 14.

Figure 26:
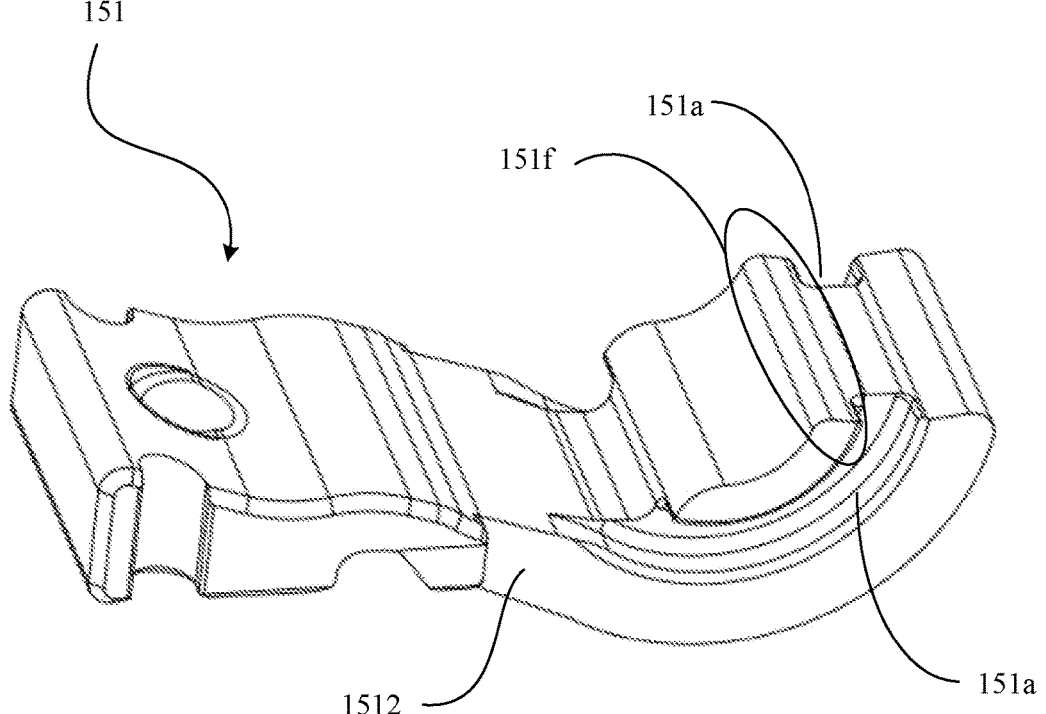
FIG. 26 is a schematic diagram of a structure of a part of a first swing arm according to an embodiment of this application.

In a possible design, FIG. 26 is a schematic diagram of a part of a structure of the first swing arm 151. With reference to FIG. 25 and FIG. 26, the arc arm 1512 of the first swing arm 151 may be used as the support portion 151*e*. Specifically, a boss 151*f* may be disposed at an end portion of the arc arm 1512. To be specific, the boss 151*f* that rotates synchronously with the first swing arm 151 abuts against the middle support plate 11, to drive the middle support plate 11 to move away from the main body 14.

In some possible designs, one of the first swing arm 151 and the second swing arm 152 may be used as the drive structure. In some other possible designs, to improve movement balance of the middle support plate 11, the first swing arm 151 and the second swing arm 152 may be used to jointly drive the middle support plate 11 to move. A process in which the second swing arm 152 drives the middle support plate 11 to move and a structure design are similar to those of the first swing arm 151. Details are not described again.

When the rotating first swing arm 151 and second swing arm 152 are used as the drive structure, in a rear segment of when the electronic device is switched from a folded state to an unfolded state, the first swing arm 151 and the second swing arm 152 abut against the middle support plate 11, to push the middle support plate 11 to move away from the main body 14. On the contrary, in a front segment of when the electronic device is switched from the unfolded state to the folded state, the first swing arm 151 and the second swing arm 152 abut against the middle support plate 11. As the first swing arm 151 and the second swing arm 152 continue to rotate, the first swing arm 151 and the second swing arm 152 do not abut against the middle support plate 11, and a push force on the middle support plate 11 is withdrawn. In this case, the middle support plate 11 moves toward the main body 14 under the action of the retractable traction element 23.

When the rotating first support plate 12 drives the middle support plate 11 to move away from the main body 14, the support portion is formed on a side that is of the first support plate 12 and that faces the main body 14. In other words, the support portion is formed on a side that is of the face B2 of the first support plate 12 and that faces the main body 14. In a process in which the electronic device moves from the folded state to the unfolded state, when the first support plate 12 rotates relative to the main body 14, the support portion of the first support plate 12 abuts against a side that is of the middle support plate 11 and that is close to the main body 14, to push the middle support plate 11 to move in a direction away from the main body 14.

Figure 27:
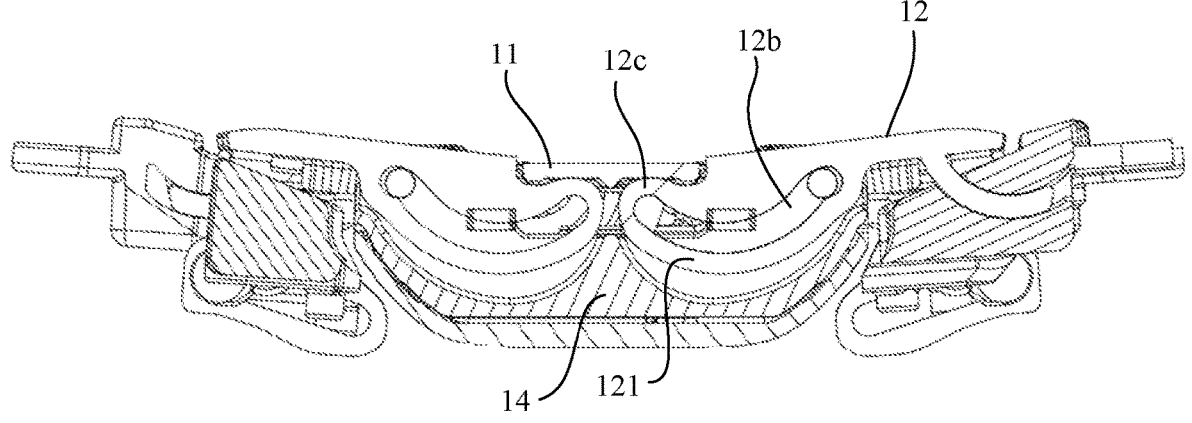
FIG. 27 is a schematic diagram of a connection relationship in which a first support plate drives a middle support plate to move according to an embodiment of this application.

In a possible design, FIG. 27 is a schematic diagram of a structure in which the first support plate 12 drives the middle support plate 11 to move in a direction away from the main body 14. In this embodiment, a boss 12*c* protruding toward the middle support plate 11 may be formed at an end of the extension portion 121 of the first support plate 12 that is provided with the first support plate sliding slot 12*b*. To be specific, the boss 12*c* that rotates synchronously with the first support plate 12 abuts against the middle support plate 11, to drive the middle support plate 11 to move away from the main body 14. In another possible design, a support portion may be separately disposed on a side that is of the first support plate 12 and that is close to the main body 14, and the support portion and the extension part having the first support plate sliding slot are two structures independent of each other.

This is similar to using the first swing arm 151 and the second swing arm 152 as the drive structure. In some possible designs, one of the first support plate 12 and the second support plate 13 may be used as the drive structure. In some other possible designs, to improve movement balance of the middle support plate 11, the first support plate 12 and the second support plate 13 may be used to jointly drive the middle support plate 11 to move. A process in which the second support plate 13 drives the middle support plate 11 to move and a structure design are similar to those of the first support plate 12. Details are not described herein again.

When the rotating first support plate 12 and second support plate 13 are used as the drive structure, when the electronic device is switched from a folded state to an unfolded state, in a rear segment, the first support plate 12 and the second support plate 13 abut against the middle support plate 11, to push the middle support plate 11 to move away from the main body 14. On the contrary, when the electronic device is switched from the unfolded state to the folded state, in a front segment, the first support plate 12 and the second support plate 13 abut against the middle support plate 11. As the first support plate 12 and the second support plate 13 continue to rotate, the first support plate 12 and the second support plate 13 do not abut against the middle support plate 11, and a push force on the middle support plate 11 is withdrawn. In this case, the middle support plate 11 moves toward the main body 14 under the action of the retractable traction element.

In some cases, if only the first swing arm 151 and the second swing arm 152 are used to push the middle support plate 11 to move away from the main body 14, when the electronic device switches from the unfolded state to the folded state, because the first swing arm 151 and the second swing arm 152 rotate at a relatively slow speed, the middle support plate 11 may not quickly move toward the main body 14. In this case, the flexible display 4000 arches toward a direction away from the middle support plate 11.

In some other cases, if only the first support plate 12 and the second support plate 13 are used to push the middle support plate 11 to move away from the main body 14, in a process in which the electronic device moves from the unfolded state to the folded state, as the first support plate 12 and the second support plate 13 rotate, after the first support plate 12 and the second support plate 13 change from abutting to non-butting, the middle support plate 11 moves quickly toward the main body 14 by being pulled by a traction element. In this case, a part that is of the flexible display 4000 and that is close to the middle support plate 11 lacks support, and consequently, a stress is relatively large, and the flexible display 4000 may be damaged.

To prevent the flexible display 4000 from being arched or reducing an arching degree of the flexible display 4000, and prevent a phenomenon that the flexible display 4000 has a large stress, in this embodiment of this application, the first swing arm 151 and the second swing arm 152 may be used as the drive structures that drive the middle support plate 11 to move away from the main body 14, and the first support plate 12 and the second support plate 13 are also used as the drive structures that drive the middle support plate 11 to move away from the main body 14. In addition, in a process of switching the electronic device from the folded state to the unfolded state, that the first support plate 12 and the second support plate 13 push the middle support plate 11 lags behind that the first swing arm 151 and the second swing arm 152 push the middle support plate 11.

Specifically, in a pre-phase of the electronic device moving from the unfolded state to the folded state, the first support plate 12 and the second support plate 13 support the middle support plate 11. Because rotation speeds of the first support plate 12 and the second support plate 13 toward the main body 14 are relatively fast, with rapid rotation of the first support plate 12 and the second support plate 13, the middle support plate 11 also moves quickly toward the main body 14, to yield a space for the flexible display 4000, and avoid an arching phenomenon in a part close to the middle support plate 11. In this design, when the electronic device moves from the folded state to the unfolded state, that is, the flexible display 4000 approaches being unfolded, the first support plate 12 and second support plate 13 that rapidly rotates push the middle support plate 11 to be quickly on coplanar with the first support plate 12 and the second support plate 13, to support the flexible display 4000.

In a process in which the electronic device moves from the unfolded state to the folded state, after the first support plate 12 and the second support plate 13 stop supporting the middle support plate 11, the middle support plate 11 is supported by using the rotating first swing arm 151 and second swing arm 152. The reason is that rotation speeds of the first swing arm 151 and the second swing arm 152 are both lower than rotation speeds of the first support plate 12 and the second support plate 13. After the first support plate 12 and the second support plate 13 stop supporting the middle support plate 11, the first swing arm 151 and the second swing arm 152 that rotate at a relatively low speed are used to support the middle support plate 11, so that a moving speed of the middle support plate 11 may be reduced, and a phenomenon that stress concentration occurs on the flexible display 4000 resulting from excessively fast withdrawal of force is avoided.

Based on the foregoing description, in a process in which the electronic device provided in this embodiment of this application moves from the unfolded state to the folded state, the middle support plate 11 has three moving phases. In a first phase, the first support plate 12 and the second support plate 13 rotate toward each other, the first swing arm 151 and the second swing arm 152 rotate toward each other, and the support portions that are of the first support plate 12 and the second support plate 13 and that abuts against the middle support plate 11 are gradually separated from the middle support plate 11, to drive the middle support plate 11 to move toward the main body 14 at a speed V1. In a second phase, as the first support plate 12 and the second support plate 13, and the first swing arm 151 and the second swing arm 152 continue to rotate, the support portions of the first support plate 12 and the second support plate 13 are separated from the middle support plate 11, the support portions of the first swing arm 151 and the second swing arm 152 abut against the middle support plate 11, and the middle support plate 11 is controlled to continue to move toward the main body 14 at a speed V2 lower than V1. In a third phase, as the first support plate 12 and the second support plate 13 and the first swing arm 151 and the second swing arm 152 continue to rotate, the support portions of the first swing arm 151 and the second swing arm 152 are also separated from the middle support plate 11, and the middle support plate 11 continues to move toward the main body 14 under the pulling force of the traction element. Finally, the first support plate 12, the second support plate 13, and the middle support plate 11 form the accommodating cavity similar to a triangle. In addition, the flexible display 4000 is included in the accommodating cavity.

Correspondingly, in a process in which the electronic device provided in this embodiment of this application moves from the folded state to the unfolded state, the middle support plate 11 also has three moving phases. In the first phase, the first support plate 12 and the second support plate 13 rotate toward each other, the first swing arm 151 and the second swing arm 152 rotate toward each other, and the middle support plate 11 remains static when being pulled by the traction element. In the second phase, as the first support plate 12 and the second support plate 13 and the first swing arm 151 and the second swing arm 152 continue to rotate, the support portions of the first swing arm 151 and the second swing arm 152 abut against the middle support plate 11, to damage the pulling force of the traction element on the middle support plate 11, and push the middle support plate 11 to move in a direction away from the main body 14 at a speed V3. In the third phase, the first swing arm 151 and the second swing arm 152 are separated from the middle support plate 11, and the support portions of the first support plate 12 and the second support plate 13 abut against the middle support plate 11, to push the middle support plate 11 to continue to move in the direction away from the main body 14 at a speed V4 greater than V3, until the first support plate 12, the middle support plate 11, and the second support plate 13 are coplanar.

The foregoing provides a drive structure that uses the first swing arm 151, the second swing arm 152, the first support plate 12, and the second support plate 13 together for pushing the middle support plate 11 to move. In some other manners, one of the first swing arm 151 and the second swing arm 152 may be used, and one of the first support plate 12 and the second support plate 13 may be used as the drive structure for driving the middle support plate 11 to move. However, to enable the middle support plate 11 to move stably and evenly, the first swing arm 151, the second swing arm 152 and the first support plate 12 and the second support plate 13 may be used together as the drive structure for driving the middle support plate 11 to move.

When the rotating shaft mechanism 1000 provided in this application includes the retractable traction element, when the electronic device moves from the folded state to the unfolded state, after both the first swing arm 151 and the second swing arm 152 abut against the middle support plate 11, the pulling force of the traction element on the middle support plate 11 needs to be first damaged, to drive the middle support plate 11 to move away from the main body 14. In this case, an elastic force of the retractable traction element on the middle support plate 11 may not be too large. For example, when the first swing arm 151 and the second swing arm 152 drive the middle support plate 11 to move, and a pushing force is f, the elastic force of the retractable traction element on the middle support plate 11 needs to be less than f. In this way, the middle support plate 11 moves away from the main body 14 when being pushed by the first swing arm 151 and the second swing arm 152.

Figure 28:
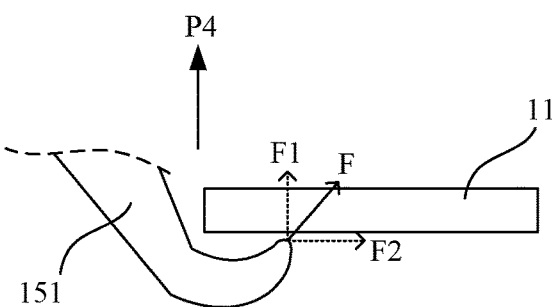
FIG. 28 is a simple schematic diagram in which a first swing arm drives a middle support plate to move according to an embodiment of this application.

In some cases, because an acting force of the first support plate 12, the second support plate 13, the first swing arm 151, or the second swing arm 152 on the middle support plate 11 is not always perpendicular to the middle support plate 11, a moving direction of the middle support plate 11 is easily unstable. For example, refer to FIG. 28. FIG. 28 is a schematic diagram of a position relationship when the first swing arm 151 rotates to abut against the middle support plate 11 and is in a specific position. At the position, the acting force of the rotating first swing arm 151 on the middle support plate 11 may be F, and the acting force F may be decomposed into vertical F1 and horizontal F2. Therefore, when the rotating first swing arm 151 drives the middle support plate 11 to move, it may be difficult to ensure that the middle support plate 11 moves in a straight line in a direction P4 perpendicular to the middle support plate 11.

Based on this possible case, the rotating shaft mechanism 1000 further includes a guide structure configured to guide the middle support plate 11 to move in a direction perpendicular to a length direction of the middle support plate 11. The length direction of the middle support plate 11 is parallel to a direction of an axis of the rotatable connection of the first swing arm 151 and the main body 14. The middle support plate 11 moves along the direction perpendicular to the length direction of the middle support plate 11, that is, the middle support plate 11 moves up and down along a straight line in a process of lifting and sinking, to ensure movement stability.

Figure 29:
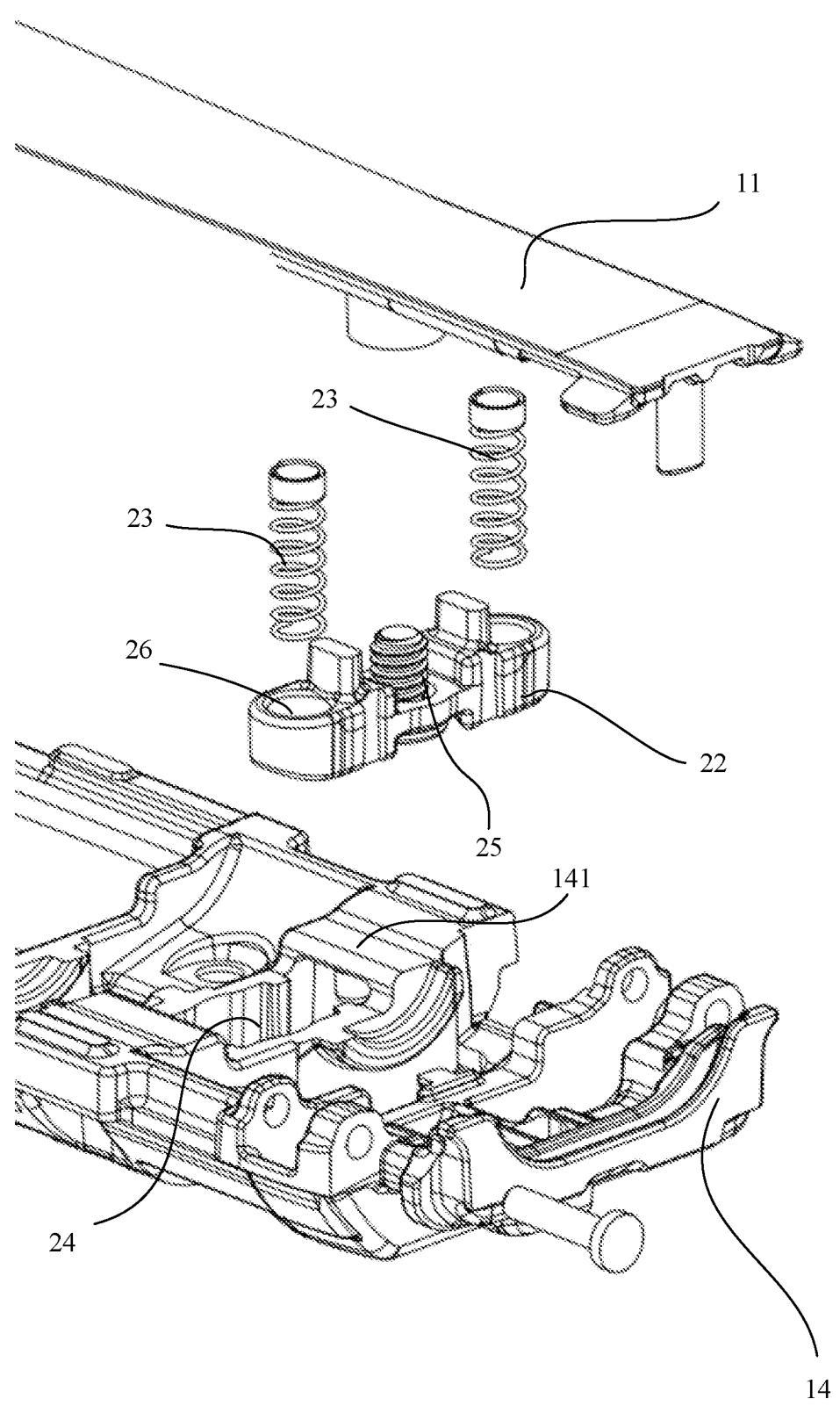
FIG. 29 is an exploded view of a middle support plate, a main body, and a guide structure according to an embodiment of this application.

The guide structure has a plurality of implementable structures. In some optional implementations, FIG. 29 is an exploded view, which is used to reflect a connection relationship between the middle support plate 11, the main body 14, and the guide structure. The guide structure includes a guide block 22 disposed on the middle support plate 11. The guide block 22 and the middle support plate 11 may be two structures independent of each other. For example, as shown in FIG. 29, the guide block 22 and the middle support plate 11 may be fastened by using a connecting component 25. Alternatively, in another possible design, the guide block 22 and the middle support plate 11 are of an integrated structure. The guide structure further includes a guide hole 24 disposed in the main body 14. An extension direction of the guide hole 24 is perpendicular to the middle support plate 11. In this way, the guide block 22 sliding in the guide hole 24 drives the middle support plate 11 to be away from the main body 14 or close to the main body 14 in a direction perpendicular to the guide block 22.

Figure 30:
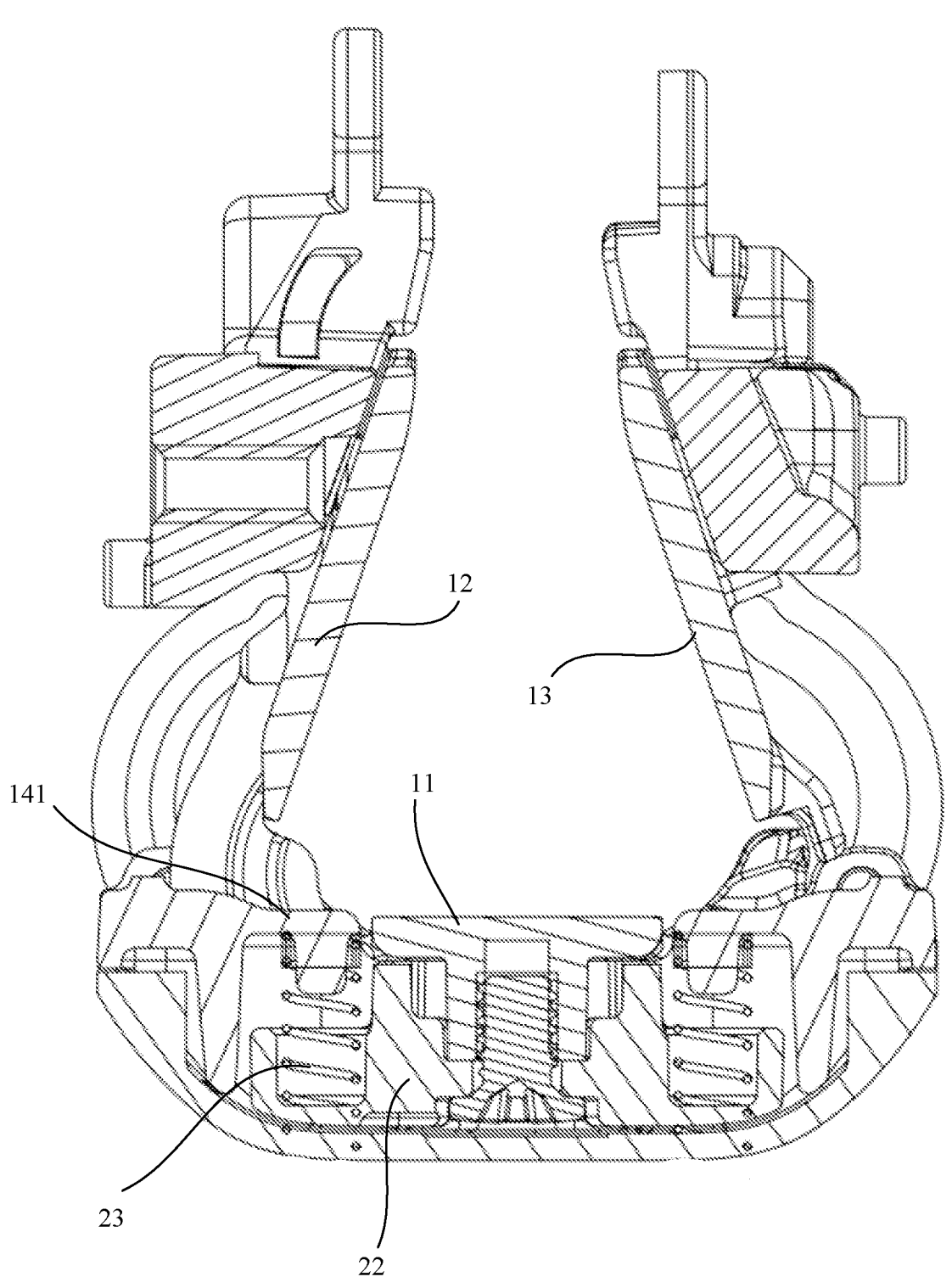
FIG. 30 is a sectional view of a connection between a middle support plate, a main body, and a guide structure according to an embodiment of this application.

FIG. 30 is a sectional view of the rotating shaft mechanism, and is used to reflect a connection relationship between the middle support plate 11, the main body 14, and the traction element 23. With reference to FIG. 29 and FIG. 30, when the rotating shaft mechanism includes the retractable traction element 23, the guide block 22, and the guide hole 24, a blocking portion 141 may be provided at an opening that is of the guide hole 24 and that is close to the middle support plate 11. In this way, a radial size at the opening of the guide hole 24 is less than a radial size in the guide hole 24, and the traction element 23 is hidden in the guide hole 24. In a possible design, as shown in FIG. 29, a blind hole 26 that does not pass through to the bottom of the guide block 24 may be disposed in the guide block 24, an end of the traction element 23 is fastened to the blocking portion 141, and the other end of the traction element 23 abuts against a bottom surface of the blind hole 26.

To enable the first housing 2000 and the second housing 3000 to perform synchronous actions relative to the rotating shaft mechanism 1000 in a folding and unfolding process of the electronic device, in an embodiment provided in this application, the rotating shaft mechanism 1000 may further include a synchronization structure, to implement synchronous rotation toward each other and synchronous rotation away from each other between the first housing 2000 and the second housing 3000.

Figure 31:
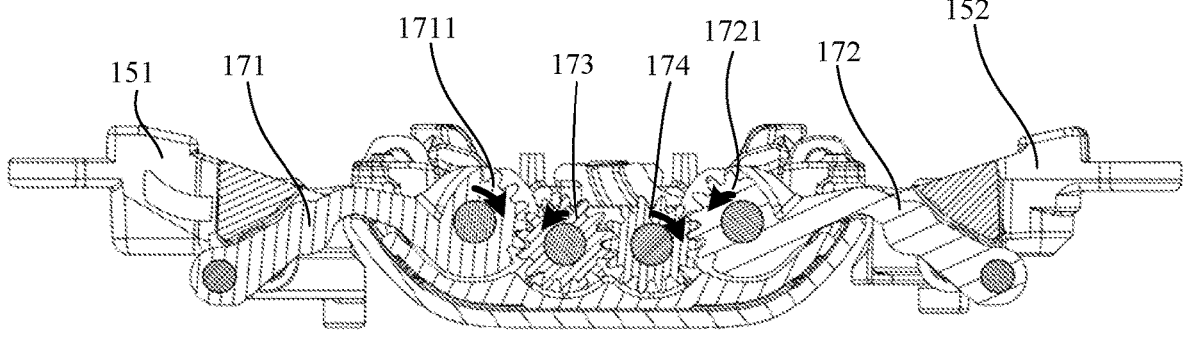
FIG. 31 is a schematic diagram of a structure of a synchronization structure according to an embodiment of this application.

The synchronization structure may have various forms of structures. For example, as shown in FIG. 31. FIG. 31 shows an implementable synchronization structure. The synchronization structure may include a gear transmission structure, and the first swing arm 151 is connected to the second swing arm 152 by using the gear transmission structure. To be specific, when the first swing arm 151 rotates relative to the main body 14, the gear transmission structure drives the second swing arm 152 to synchronously rotate in an opposite direction. In this way, the first housing 2000 fastened to the first swing arm 151 and the second housing 3000 fastened to the second swing arm 152 may synchronously rotate in an opposite direction.

As shown in FIG. 31, the gear transmission structure may include a first gear connecting rod 171 and a second gear connecting rod 172. An end of the first gear connecting rod 171 is slidably connected to the first swing arm 151, and the other end of the first gear connecting rod 171 has a first meshing tooth 1711. An end of the second gear connecting rod 172 is slidably connected to the second swing arm 152, and the other end of the second gear connecting rod 172 has a second meshing tooth 1721. In an implementable design, the gear transmission structure further includes an even number of driven gears. For example, the gear transmission structure may include two, four, or six driven gears. FIG. 31 shows an example in which two driven gears are included. The two driven gears are a first driven gear 173 and a second driven gear 174, and the first driven gear 173 and the second driven gear 174 externally mesh. The first driven gear 173 further externally meshes the first meshing tooth 1711 on the first gear connecting rod 171, and the second driven gear 174 externally mesh the second meshing tooth 1721 on the second gear connecting rod 172. In another implementable design, the first meshing tooth 1711 directly meshes with the second meshing tooth 1721, that is, when the first gear connecting rod 171 rotates, the second gear connecting rod 172 is directly driven to move in an opposite direction, so that the first swing arm 151 and the second swing arm 152 move in opposite directions, which implements mutual convergence or separation between the first housing and the second housing.

In the synchronization structure shown in FIG. 31, rotation axes of the first gear connecting rod 171, the first driven gear 173, the second driven gear 174, and the second gear connecting rod 172 all need to be parallel to a rotation axis of the first swing arm 151 on the main body 14 and a rotation axis of the second swing arm 152 on the main body 14.

Figure 32:
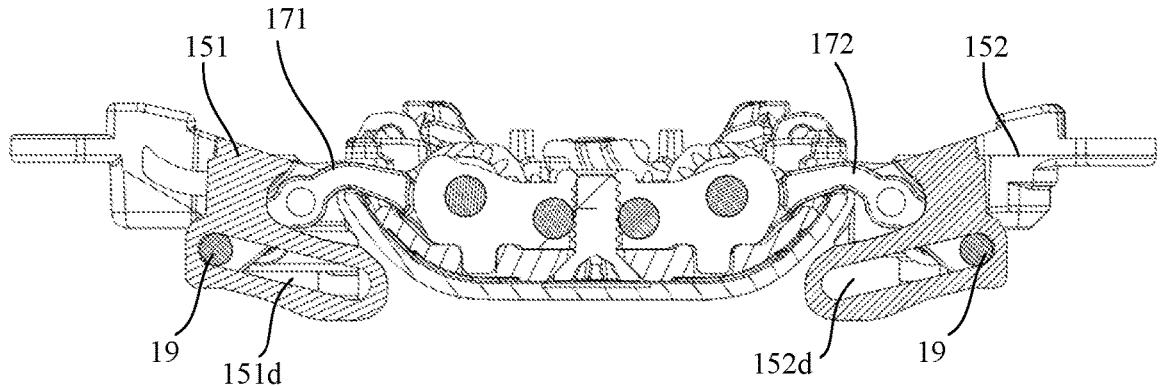
FIG. 32 is a schematic diagram of a connection relationship between a synchronization structure, a first swing arm, and a second swing arm according to an embodiment of this application.

To implement a slidable connection between the first gear connecting rod 171 and the first swing arm 151, as shown in FIG. 32, FIG. 32 is used to reflect a slidable connection relationship between the first gear connecting rod 171 and the first swing arm 151, and is used to reflect a slidable connection relationship between the second gear connecting rod 172 and the second swing arm 152. The first gear connecting rod 171 is connected to the first swing arm 151 by using a pin shaft 19, and the pin shaft 19 is fastened to the first gear connecting rod 171. In addition, the first swing arm 151 is provided with a first track slot 151*d* for the pin shaft 19 to slide, and the slidable connection between the first gear connecting rod 171 and the first swing arm 151 is implemented through sliding coordination between the pin shaft 19 and the first track slot 151*d*.

Similarly, to implement the slidable connection between the second gear connecting rod 172 and the second swing arm 152, as shown in FIG. 32, the second gear connecting rod 172 is connected to the second swing arm 151 by using the pin shaft 19, and the pin shaft 19 is fastened to the second gear connecting rod 172. The second swing arm 152 is provided with a second track slot 152*d* for the pin shaft 19 to slide, to implement the slidable connection between the second gear connecting rod 172 and the second swing arm 152.

The following describes a working process of the synchronization structure with reference to FIG. 31. If the first swing arm 151 rotates in a clockwise direction shown in FIG. 31, the first gear connecting rod 171 is driven to rotate clockwise based on a sliding coordination relationship between the pin shaft 191 and the first track slot 151*d*, the rotating first gear connecting rod 171 drives the first driven gear 173 to rotate in an opposite direction, the first driven gear 173 drives the second driven gear 174 externally meshing the first driven gear 173 to rotate clockwise, and the second driven gear 174 then drives the second gear connecting rod 172 to rotate counter-clockwise, to drive the second swing arm 152 to rotate counter-clockwise. Finally, the first swing arm 151 and the second swing arm 152 rotate synchronously in opposite directions, to implement folding of the flexible display.

On the contrary, if the first swing arm 151 rotates in a counter-clockwise direction shown in FIG. 31, the first gear connecting rod 171 is driven to rotate in the counter-clockwise direction, the rotating first gear connecting rod 171 drives the first driven gear 173 to rotate clockwise, the first driven gear 173 drives the second driven gear 174 externally meshing the first driven gear 173 to rotate in the counter-clockwise direction, and the second driven gear 174 drives the second gear connecting rod 172 to rotate clockwise, to drive the second swing arm 152 to rotate clockwise. Finally, the first swing arm 151 and the second swing arm 152 synchronously rotate in opposite directions, to implement unfolding of the flexible display.

Figure 33:
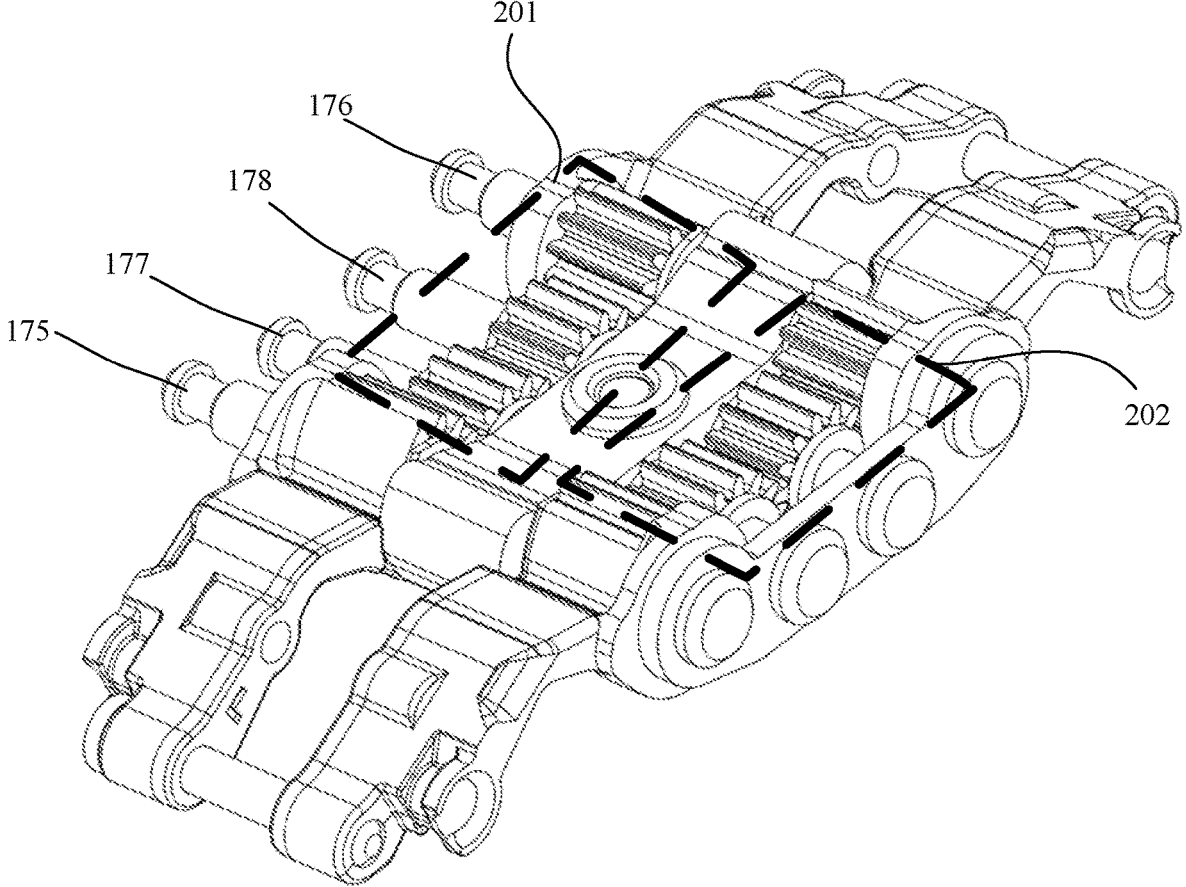
FIG. 33 is a schematic diagram of a structure of two groups of synchronization structures according to an embodiment of this application.

In some implementations, when there are at least two first swing arms 151, correspondingly, at least two groups of synchronization structures are required, and a plurality of groups of synchronization structures are connected to a plurality of first swing arms 151 in a one-to-one manner. For example, FIG. 33 shows two groups of synchronization structures, which are a first synchronization structure 201 and a second synchronization structure 202. The first synchronization structure 201 is connected to one of the two first swing arms, and the second synchronization structure 202 is connected to the other of the two first swing arms.

If there are the plurality of groups of synchronization structures, as shown in FIG. 33, when each synchronization structure includes a gear transmission structure, a first gear connecting rod 171 in the first synchronization structure and a first gear connecting rod 171 in the second synchronization structure are coaxially disposed by using a first connecting shaft 175. Similarly, a second gear connecting rod 172 in the first synchronization structure and a second gear connecting rod 172 in the second synchronization structure are coaxially disposed by using a second connecting shaft 176, a first driven gear 173 in the first synchronization structure and a first driven gear 173 in the second synchronization structure are coaxially disposed by using a third connecting shaft 177, and a second driven gear 174 in the first synchronization structure and a second driven gear 174 in the second synchronization structure are coaxially disposed by using the fourth connecting shaft 178. In this way, when the two first swing arms 151 rotate synchronously, the two second swing arms 152 synchronously rotate in opposite directions.

Refer to FIG. 2 and the rotating shaft mechanism 1000 provided in the foregoing embodiments. The flexible display 4000 continuously covers the first housing 2000, the rotating shaft mechanism 1000, and the second surface 3001 of the second housing 3000 of the foldable electronic device. The region A corresponds to the first surface 2001 of the first housing 2000, and may be fastened to the first surface 2001 of the first housing 2000. The region E corresponds to the second surface 3001 of the second housing 3000, and may be fastened to the second surface 3001 of the second housing 3000. The region B is fastened to the first support plate 12 of the rotating shaft mechanism, the region D is fastened to the second support plate 13 of the rotating shaft mechanism, the region C is opposite to the middle support plate 11, and the region C may move relative to the middle support plate 11.

The rotating shaft mechanism 1000 provided in this application further includes an end cap 21, and the main body 14 is fastened to the end cap 21. As shown in FIG. 2, after the first housing 2000 and the second housing 3000 are unfolded, an end face of the first housing 2000 is close to an end face of the second housing 3000, and the rotating shaft mechanism 1000 including the end cap 21 is hidden in the first housing 2000 and the second housing 3000. In other words, the rotating shaft mechanism 1000 may not be seen from an appearance of the electronic device. This improves appearance aesthetics of the mobile terminal. As shown in FIG. 4, when the first housing 2000 and the second housing 3000 are folded and are in a folded state, the end cap 21 of the rotating shaft mechanism 1000 is exposed, to fill a gap between the first housing 2000 and the second housing 3000. In this way, the appearance aesthetics of the electronic device are also ensured. To be specific, regardless of whether the electronic device is in the folded state or in the unfolded state, an internal structure is hidden, and an appearance of an entire structure is complete, so that aesthetics are good.

In descriptions of this specification, the described specific features, structures, materials, or characteristics may be combined in a proper manner in any one or more of embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to protection scope of the claims.

What is claimed is:

1. A rotating shaft mechanism, comprising:
a main body;
a first support plate, a second support plate, and a middle support plate, the first support plate, the second support plate, and the middle support plate being located on a same side of the main body, the first support plate and the second support plate being disposed on opposite sides of the middle support plate; and
a first swing arm and a second swing arm, the first swing arm and the second swing arm being disposed on opposite sides of the main body, wherein:
a first end of the first swing arm that is positioned in close proximity to the main body is rotatably connected to the main body, a first end of the first support plate is rotatably connected to a second end of the first swing arm that is positioned away from the main body, and a second end of the first support plate is slidably connected to the main body;
a first end of the second swing arm that is positioned in close proximity to the main body is rotatably connected to the main body, a first end of the second support plate is rotatably connected to a second end of the second swing arm that is positioned away from the main body, and a second end of the second support plate is slidably connected to the main body;
at least one of the first support plate, the second support plate, the first swing arm, and the second swing arm is disposed with a support portion;
when the first swing arm and the second swing arm rotate toward each other, the first swing arm drives the first end of the first support plate that is positioned in close proximity to the main body to move in a direction away from the main body, and the second swing arm drives the end of the second support plate that is positioned in close proximity to the main body to move in a direction away from the main body to enable the support portion to be separated from the middle support plate, and the middle support plate to move in a direction close to the main body;
when the first swing arm and the second swing arm rotate away from each other, the first swing arm drives the end of the first support plate that is positioned in close proximity to the main body to move in a direction close to the main body, and the second swing arm drives the end of the second support plate that is positioned in close proximity to the main body to move in a direction close to the main body to enable the support portion to abut against the middle support plate and to drive the middle support plate to move in a direction away from the main body;
the support portion is disposed on each of the first support plate, the second support plate, the first swing arm, and the second swing arm; and
a process in which the first swing arm and the second swing arm move toward each other comprises a first phase, a second phase, and a third phase that appear sequentially in which:
in the first phase, both the support portion of the first support plate and the support portion of the second support plate abut against the middle support plate, and both the support portion of the first swing arm and the support portion of the second swing arm are separated from the middle support plate;
in the second phase, both the support portion of the first swing arm and the support portion of the second swing arm abut against the middle support plate; and
in the third phase, the support portion of the first support plate, the support portion of the second support plate, the support portion of the first swing arm, and the support portion of the second swing arm are all separated from the middle support plate.

2. The rotating shaft mechanism according to claim 1, wherein:
when the first swing arm and the second swing arm rotate toward each other to drive the first support plate and the second support plate to rotate toward each other to a first position, the first support plate, the middle support plate, and the second support plate enclose a screen accommodation space; and
when the first swing arm and the second swing arm rotate away from each other to drive the first support plate and the second support plate to rotate away from each other to a second position, the first support plate, the middle support plate, and the second support plate are located on a same plane to form a support surface.

3. The rotating shaft mechanism according to claim 1, further comprising:
a retractable traction element, a first end of the traction element is fastened to the main body, a second end is fastened to the middle support plate, and the traction element is configured to drive the middle support plate to move in a direction toward the main body.

4. The rotating shaft mechanism according to claim 3, further comprising:
a guide structure configured to guide the middle support plate to move relative to the main body along a direction perpendicular to a longitudinal axis of the middle support plate.

5. The rotating shaft mechanism according to claim 4, wherein the guide structure comprises:
a guide hole disposed in the main body and a guide block slidably disposed in the guide hole, the guide hole extending along a direction perpendicular to the longitudinal axis of the middle support plate; and the guide block is fastened to the middle support plate.

6. The rotating shaft mechanism according to claim 5, wherein an opening of the guide hole that is positioned in close proximity to the middle support plate includes a blocking portion, the traction element is disposed in the guide hole, the guide block includes a blind hole disposed from a surface in close proximity to the middle support plate toward a bottom surface of the guide hole, an end of the traction element being fastened to the blocking portion, and another end of the traction element abutting against a bottom surface of the blind hole.

7. The rotating shaft mechanism according to claim 6, wherein both a side surface of the first support plate and a side surface of the second support plate relative to the main body have an extension portion, the extension portion extending toward a side surface of the middle support plate relative to the main body, the extension portion including a first boss protruding toward the middle support plate to form a support portion of the first support plate and a support portion of the second support plate; and wherein a support plate sliding slot is disposed on both the extension portion of the first support plate and the extension portion of the second support plate, a sliding shaft is disposed in the support plate sliding slot, the sliding shaft is fastened to the main body, and the sliding shaft slides relative to the support plate sliding slot to implement a slidable connection between the first support plate, the second support plate and the main body.

8. The rotating shaft mechanism according to claim 1, wherein ends of the first swing arm and the second swing arm that are in close proximity to the main body include a second boss protruding toward a surface of the middle support plate relative to the main body to form a support portion of the first swing arm and a support portion of the second swing arm.

9. The rotating shaft mechanism according to claim 8, wherein a first arc-shaped bump and a second arc-shaped bump are disposed on the main body;

a first arc-shaped arm with an arc-shaped structure is formed at an end of the first swing arm that is in close proximity to the main body, a first arc-shaped slot configured to assemble the first arc-shaped bump is disposed on the first arc-shaped arm, and the first arc-shaped bump slides relative to the first arc-shaped slot to implement a rotating connection between the first swing arm and the main body;

a second arc-shaped arm with an arc-shaped structure is formed at an end of the second swing arm that is in close proximity to the main body, a second arc-shaped slot configured to assemble the second arc-shaped bump is disposed on the second arc-shaped arm, and the second arc-shaped bump slides relative to the second arc-shaped slot to implement a rotating connection between the second swing arm and the main body; and the second boss is disposed on the first arc-shaped arm and the second arc-shaped arm.

10. The rotating shaft mechanism according to claim 1, wherein a surface of the first support plate that faces the main body has a first support plate arc-shaped bump extending toward the first swing arm, a third arc-shaped slot configured to assemble the first support plate arc-shaped bump is disposed on the first swing arm, and the first support plate arc-shaped bump slides relative to the third arc-shaped slot to implement a rotating connection between the first support plate and the first swing arm; and a surface is of the second support plate that is relative to the main body has a second support plate arc-shaped bump extending toward the second swing arm, a fourth arc-shaped slot configured to assemble the second support plate arc-shaped bump is disposed on the second swing arm, and the second support plate arc-shaped bump slides relative to the fourth arc-shaped slot to implement a rotating connection between the second support plate and the second swing arm.

11. The rotating shaft mechanism according to claim 1, wherein the rotating shaft mechanism further comprises: a synchronization structure separately connected to the first swing arm and the second swing arm in a sliding manner, and the synchronization structure is configured to implement synchronous reverse rotation of the first swing arm and the second swing arm; and wherein the synchronization structure comprises:

a first gear connecting rod, wherein an end of the first gear connecting rod is slidably connected to an end that is of the first swing arm and that is away from the main body, and another end of the first gear connecting rod forms a first meshing tooth;

a first driven gear, externally meshing the first meshing tooth;

a second driven gear, externally meshing the first driven gear; and a second gear connecting rod, wherein an end of the second gear connecting rod is slidably connected to an end of the second swing arm positioned away from the main body, another end of the second gear connecting rod forms a second meshing tooth, and the second driven gear meshes the second meshing tooth.

12. An electronic device, comprising:

a first housing, a second housing, a flexible display, and a rotating shaft mechanism, wherein the first housing is fastened to a first swing arm, and the second housing is fastened to a second swing arm;

the first housing comprising a first surface, the second housing comprises a second surface, the flexible display covers the first surface of the first housing, the rotating shaft mechanism, and the second surface of the second housing, the flexible display being fastened to the first surface of the first housing and the second surface of the second housing; and wherein the rotating shaft mechanism comprises:

a main body;

a first support plate, a second support plate, and a middle support plate, the first support plate, the second support plate, and the middle support plate being located on a same side of the main body, the first support plate and the second support plate being disposed on opposite sides of the middle support plate; and a first swing arm and a second swing arm, the first swing arm and the second swing arm being disposed on opposite sides of the main body, wherein:

a first end of the first swing arm that is positioned in close proximity to the main body is rotatably connected to the main body, a first end of the first support plate is rotatably connected to a second end of the first swing arm that is positioned away from the main body, and a second end of the first support plate is slidably connected to the main body;

a first end of the second swing arm that is positioned in close proximity to the main body is rotatably connected to the main body, a first end of the second support plate is rotatably connected to a second end of the second swing arm that is positioned away from the main body, and a second end of the second support plate is slidably connected to the main body;

at least one of the first support plate, the second support plate, the first swing arm, and the second swing arm is disposed with a support portion;

when the first swing arm and the second swing arm rotate toward each other, the first swing arm drives the first end of the first support plate that is positioned in close proximity to the main body to move in a direction away from the main body, and the second swing arm drives the end of the second support plate that is positioned in close proximity to the main body to move in a direction away from the main body to enable the support portion to be separated from the middle support plate and the middle support plate to move in a direction close to the main body; and when the first swing arm and the second swing arm rotate away from each other, the first swing arm drives the end of the first support plate that is positioned in close proximity to the main body to move in a direction close to the main body, and the second swing arm drives the end of the second support plate that is positioned in close proximity to the main body to move in a direction close to the main body to enable the support portion to abut against the middle support plate and to drive the middle support plate to move in a direction away from the main body:

the support portion is disposed on each of the first support plate, the second support plate, the first swing arm, and the second swing arm; and a process in which the first swing arm and the second swing arm move toward each other comprises a first phase, a second phase, and a third phase that appear sequentially in which:

in the first phase, both the support portion of the first support plate and the support portion of the second support plate abut against the middle support plate, and both the support portion of the first swing arm and the support portion of the second swing arm are separated from the middle support plate;

in the second phase, both the support portion of the first swing arm and the support portion of the second swing arm abut against the middle support plate; and in the third phase, the support portion of the first support plate, the support portion of the second support plate, the support portion of the first swing arm, and the support portion of the second swing arm are all separated from the middle support plate.

13. The electronic device according to claim 12, wherein the flexible display comprises a first area, a second area, a third area, a fourth area, and a fifth area that are consecutively disposed; and the first area is fastened to the first surface of the first housing, the second area is fastened to a surface of the first support plate facing the flexible display, the third area is disposed opposite the middle support plate and is movable relative to the middle support plate, the fourth area is fastened to a surface of the second support plate facing the flexible display, and the fifth area is fastened to the second surface of the second housing.

14. The electronic device according to claim 13, wherein:

when the first swing arm and the second swing arm rotate toward each other to drive the first support plate and the second support plate to rotate toward each other to a first position, the first support plate, the middle support plate, and the second support plate enclose a screen accommodation space; and when the first swing arm and the second swing arm rotate away from each other to drive the first support plate and the second support plate to rotate away from each other to a second position, the first support plate, the middle support plate, and the second support plate are located on a same plane to form a support surface.

15. The electronic device according to claim 12, the rotating shaft mechanism further comprising:

a retractable traction element, a first end of the traction element being fastened to the main body, another end being fastened to the middle support plate, and the traction element is configured to drive the middle support plate to move in a direction close to the main body; and a guide structure configured to guide the middle support plate to move relative to the main body along a direction perpendicular to a longitudinal axis of the middle support plate.

16. The electronic device according to claim 15, the guide structure further comprising:

a guide hole disposed in the main body and a guide block slidably disposed in the guide hole, the guide hole extending along a direction perpendicular to the longitudinal axis of the middle support plate; and the guide block is fastened to the middle support plate;

wherein an opening of the guide hole in close proximity to the middle support plate includes a blocking portion, the traction element is disposed in the guide hole, the guide block includes a blind hole disposed from a surface close to the middle support plate toward a bottom surface of the guide hole, a first end of the traction element being fastened to the blocking portion, and another end of the traction element abuts against the bottom surface of the blind hole.

17. The electronic device according to claim 16, wherein:

a side surface of the first support plate and a side surface of the second support plate relative to the main body each include an extension portion extending toward a side surface of the middle support plate relative to the main body, the extension portion including a first boss protruding toward the middle support plate to form the support portion of the first support plate and the support portion of the second support plate; and a support plate sliding slot is disposed on each of the extension portion of the first support plate and the extension portion of the second support plate, a sliding shaft is disposed in the support plate sliding slot, the sliding shaft is fastened to the main body, and the sliding shaft is slidably displaceable relative to the support plate sliding slot to implement a slidable connection between the first support plate, the second support plate and the main body.

18. The electronic device according to claim 12, wherein:

ends of the first swing arm and the second swing arm that are in close proximity to the main body include a second boss protruding toward a surface of the middle support plate and relative to the main body to form the support portion of the first swing arm and the support portion of the second swing arm; and a first arc-shaped bump and a second arc-shaped bump are disposed on the main body;

a first arc-shaped arm with an arc-shaped structure is formed at an end of the first swing arm that is in close proximity to the main body, a first arc-shaped slot configured to assemble the first arc-shaped bump is disposed on the first arc-shaped arm, and the first arc-shaped bump is slidably displaceable relative to the first arc-shaped slot to implement a rotating connection between the first swing arm and the main body;

a second arc-shaped arm with an arc-shaped structure is formed at an end of the second swing arm in close proximity to the main body, a second arc-shaped slot configured to assemble the second arc-shaped bump is disposed on the second arc-shaped arm, and the second arc-shaped bump is slidably displaceable relative to the second arc-shaped slot to implement a rotating connection between the second swing arm and the main body; and the second boss is disposed on the first arc-shaped arm and the second arc-shaped arm.

19. The electronic device according to claim 12, wherein:

a surface of the first support plate facing the main body includes a first support plate arc-shaped bump extending toward the first swing arm, a third arc-shaped slot configured to assemble the first support plate arc-shaped bump is disposed on the first swing arm, and the first support plate arc-shaped bump is slidably displaceable relative to the third arc-shaped slot to implement a rotating connection between the first support plate and the first swing arm; and a surface of the second support plate includes a second support plate arc-shaped bump extending toward the second swing arm, a fourth arc-shaped slot configured to assemble the second support plate arc-shaped bump is disposed on the second swing arm, and the second support plate arc-shaped bump is slidably displaceable relative to the fourth arc-shaped slot to implement a rotating connection between the second support plate and the second swing arm.

20. The electronic device according to claim 12, the rotating shaft mechanism further comprising:

a synchronization structure slidably connected to the first swing arm and to the second swing arm and configured to implement synchronous reverse rotation of the first swing arm and the second swing arm, the synchronization structure comprising:

a first gear connecting rod, a first end of the first gear connecting rod being slidably connected to an end of the first swing arm positioned away from the main body, and another end of the first gear connecting rod forms a first meshing tooth;

a first driven gear externally meshing the first meshing tooth;

a second driven gear externally meshing the first driven gear; and a second gear connecting rod, a first end of the second gear connecting rod being slidably connected to an end of the second swing arm positioned away from the main body, a second end of the second gear connecting rod forming a second meshing tooth, the second driven gear meshing the second meshing tooth.

* * * * *